(12) United States Patent
Carusone et al.

(10) Patent No.: US 8,787,776 B2
(45) Date of Patent: Jul. 22, 2014

(54) OPTICAL RECEIVER WITH MONOLITHICALLY INTEGRATED PHOTODETECTOR

(75) Inventors: Anthony Chan Carusone, Burlington (CA); Tony Shuo-Chun Kao, Sunnyvale, CA (US); Hemesh Yasotharan, Toronto (CA)

(73) Assignee: The Governing Council of the University of Toronto, Toronto (CA)

( * ) Notice: Subject to any disclaimer, the term of this patent is extended or adjusted under 35 U.S.C. 154(b) by 511 days.

(21) Appl. No.: 13/152,320

(22) Filed: Jun. 3, 2011

(65) Prior Publication Data

US 2012/0141122 A1 Jun. 7, 2012

Related U.S. Application Data

(60) Provisional application No. 61/351,496, filed on Jun. 4, 2010.

(51) Int. Cl.
*H04B 10/06* (2006.01)

(52) U.S. Cl.
USPC .................. 398/202; 398/206; 398/208

(58) Field of Classification Search
USPC .................................. 398/202–214
See application file for complete search history.

(56) References Cited

U.S. PATENT DOCUMENTS

| 6,157,035 | A | 12/2000 | Kuijk et al. |
| 7,180,048 | B1 | 2/2007 | Zhao |
| 7,224,911 | B2 | 5/2007 | Dai et al. |
| 7,251,297 | B2 | 7/2007 | Agazzi |
| 7,423,252 | B2 | 9/2008 | Zhao |
| 7,453,935 | B2 | 11/2008 | Agazzi et al. |
| 7,630,434 | B2 | 12/2009 | Agazzi et al. |
| 2002/0060827 | A1* | 5/2002 | Agazzi .................... 359/161 |
| 2004/0056181 | A1 | 3/2004 | Ono |
| 2005/0052255 | A1* | 3/2005 | Chiang .................... 333/18 |
| 2006/0239341 | A1* | 10/2006 | Marlett et al. ............ 375/233 |
| 2006/0274861 | A1* | 12/2006 | Langenbach et al. ...... 375/341 |
| 2009/0296791 | A1 | 12/2009 | Agazzi et al. |
| 2010/0086019 | A1 | 4/2010 | Agazzi et al. |

FOREIGN PATENT DOCUMENTS

| EP | 1229699 A2 | 8/2002 |
| WO | 2009/045193 A1 | 4/2009 |

OTHER PUBLICATIONS

Kao, Tony Shuo-Chun, et al., "A 5-Gbps Optical Receiver with Monolithically Integrated Photodetector in 0.18-μm CMOS," Radio Frequency Integrated Circuits Symposium, 2009, RFIC 2009, IEEE, Jun. 7-9, 2009, pp. 451-454.

\* cited by examiner

*Primary Examiner* — Dzung Tran
(74) *Attorney, Agent, or Firm* — Lewis, Rice & Fingersh, L.C.

(57) ABSTRACT

An optical receiver includes a photodetector for detecting incoming optical data signals and an amplifier for providing signal gain and current to voltage conversion. The detection signal generated by the photodetector may include a distortion component caused by an operating characteristic of the photodetector. A signal compensating circuit may reconstruct the received optical data signal by effectively canceling the distortion component. For this purpose, the signal compensating circuit may include a decision feedback equalizer implemented using at least one feedback filter matched to the operating characteristic of the photodetector causing the signal distortion so as to reproduce the distortion component for cancellation. Use of a control module may also configure the optical receiver in real time to account for other operating and environmental conditions of the optical receiver. Data rates in excess of 5 Gbps may be realized in monolithic CMOS photodetectors when the signal compensating circuit is properly matched.

24 Claims, 20 Drawing Sheets

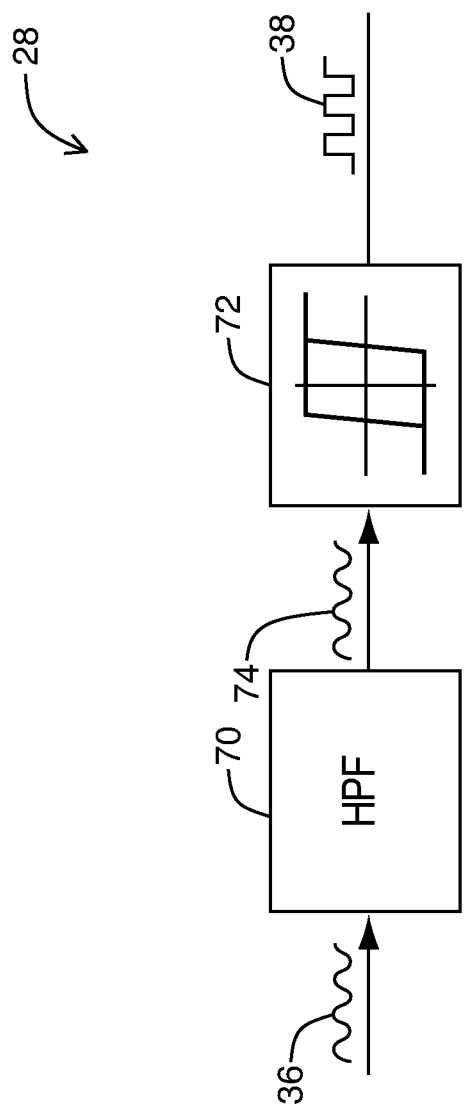

OPTICAL RECEIVER WITH MONOLITHICALLY INTEGRATED PHOTODETECTOR

CROSS-REFERENCE TO RELATED APPLICATIONS

This application claims the benefit of U.S. Provisional Application Ser. No. 61/351,496 filed on Jun. 4, 2010, the entire contents of which are hereby incorporated by reference.

FIELD

Embodiments of the present invention relate generally to optical receivers and, more particularly, to compensated optical receivers having monolithically integrated photodetectors.

INTRODUCTION

Optical receivers may be utilized in various different applications, such as local-area networks (LAN) and fiber-to-the-home (FTTH) interconnects, as well as in interfaces for optical storage systems, such as CD-ROM, DVD and Blu-Ray Disc. In these applications, a photodetector may be used to convert incoming optical data signals into electrical detection signals for further processing, such as decoding, amplification, equalization, and compensation. In some types of optical data systems, the photodetector may be housed in a separate chip or as a standalone component and connected to other signal processing elements in the optical data system using bond wires or other connections. Although this solution allows for the use of high quality and high data rate photodetectors, extra overhead and assembly cost associated with the photodetector, as well as electrostatic discharge (ESD) problems and other parasitics associated with the bond wires, may be some of the resulting drawbacks.

In other optical data systems, the photodetector may be monolithically integrated with other signal processing components on a single semiconductor substrate and implemented, for example, using standard integrated circuit (IC) technologies, such as complementary metal oxide semiconductor (CMOS), Silicon Germanium (SiGe) and mixed bipolar CMOS (BiCMOS) processes. Light detection in CMOS technology may be performed using a pn junction fabricated in the substrate, for example by appropriate doping of the semiconductor, and operated with a reverse bias voltage to create a depletion region. When an incoming optical data signal is received at the photodetector, electron-hole pairs (i.e., charge carriers) generated by the incident photons may be collected at either terminal of the pn junction for intensity measurement and optional post-detection processing in order to reconstruct the transmitted optical data signal. Because the photodetector is monolithically integrated on the semiconductor, use of bond wires is minimized and overhead is reduced. Other advantages common to integrated devices, such as low cost and mass manufacturability, are also realized.

SUMMARY

In accordance with one aspect, there is provided an optical receiver comprising a photodetector, an amplifier and a signal compensation circuit. The photodetector may generate a detection signal representative of an optical data signal received at the photodetector and having a distortion component caused by an operating characteristic of the photodetector. The amplifier may amplify the detection signal to generate an amplified detection signal. The signal compensation circuit may generate a reconstructed data signal from the amplified detection signal and may comprise a decision feedback equalizer matched to the operating characteristic of the photodetector, so that the distortion component of the detection signal is substantially suppressed in the reconstructed data signal.

The operating characteristic of the photodetector may comprise a diffusion current induced in the photodetector by the optical data signal.

The decision feedback equalizer may comprise a summer, a non-linear element and at least one filter. The summer may be configured to generate a compensated detection signal by subtracting a feedback compensation signal from the amplified detection signal. The non-linear element may be coupled to the summer to generate the reconstructed data signal from the compensated detection signal. The at least one filter may be coupled between the non-linear element and the summer in a feedback compensation loop to generate the feedback compensation signal based on the reconstructed data signal and may be configured to model the operating characteristic of the photodetector, so that the distortion component of the detection signal is substantially reproduced by the feedback compensation signal.

The non-linear element may comprise a signal quantizer, but alternatively may comprise a high-pass filter and a hysteretic comparator coupled to the high-pass filter.

The decision feedback equalizer may comprise a plurality of filters coupled between the non-linear element and the summer in parallel in the feedback compensation loop, each of the plurality of filters configured to provide a respective portion of the feedback compensation signal. Each of the plurality of filters may be a single-pole continuous-time filter. Alternatively, the plurality of filters may comprise at least one digital filter and at least one continuous-time filter, the at least one digital filter configured to compensate fast distortion components and the at least one continuous-time filter configured to compensate slow distortion components. In such cases, each of the at least one continuous-time filter may be a single-pole filter and the at least one digital filter may comprise a higher-order finite impulse response filter. The decision feedback equalizer may comprise between three and five filters arranged in parallel in the feedback compensation loop.

The signal compensation circuit may further comprise a control module for configuring the decision feedback equalizer to match the operating characteristic of the photodetector by adjusting at least one parameter of the decision feedback equalizer. The at least one parameter of the decision feedback equalizer may comprise a time constant or a gain value for the at least one filter.

The control module may comprise a dc extractor, a dc reference generator, a second summer and a filter controller. The dc extractor may measure a dc component of the compensated detection signal. The dc reference generator may generate a reference dc component of the compensated detection signal. The second summer may be configured to generate a compensation error signal by comparing the measured and reference dc components of the compensated detection signal, where the compensation error signal is representative of uncompensated distortion in the compensated detection signal. The filter controller may be configured to generate control values based on the compensation error signal used to adjust the at least one parameter of the decision feedback equalizer.

The dc reference generator may comprise a peak detector for generating an envelope signal representative of a pulse height of the optical data signal, and a scaler coupled to the peak detector for scaling the envelope signal according to a bit distribution of the optical data signal to generate the reference dc component of the compensated detection signal.

The decision feedback equalizer may comprise at least one continuous-time filter implemented by a controllable RC-network. In that case, the filter controller may be configured to apply control signals to the controllable RC-network based on the compensation error signal used to vary effective resistance and capacitance values of the controllable RC-network.

The amplifier may comprise a negative Miller capacitor incorporated into a core of the amplifier to extend an internal pole of the amplifier for increased bandwidth and phase margin.

The optical receiver may further comprise an equalizer coupled between the amplifier and the signal compensation circuit for providing high-frequency signal boosting.

The optical receiver may further comprise an ac coupling circuit coupled between the photodetector and the amplifier for suppressing low frequency components of the detection signal.

The photodetector may be a spatially modulated light detector, in which case the optical receiver may further comprise a subtractor downstream of the photodetector configured to generate the detection signal by subtracting a pair of differential detection signals generated by the spatially modulated light detector.

The photodetector may be integrated monolithically within the optical receiver on a common semiconductor substrate. The optical receiver may be implemented in CMOS or BiCMOS technology.

The optical receiver may have a bandwidth of at least 5 Gbps.

In accordance with another aspect, there is provided an optical receiver comprising a photodetector, an amplifier and a signal compensation circuit. The photodetector may generate a detection signal representative of an optical data signal received at the photodetector and having a distortion component caused by an operating characteristic of the photodetector and a data component. The amplifier may amplify the detection signal to generate an amplified detection signal. The signal compensation circuit may generate a reconstructed data signal from the amplified detection signal to represent the data component of the detection signal and may comprise a high-pass filter and a hysteretic comparator. The high-pass filter may generate an intermediate signal based on the amplified detection signal and have a pass band configured to substantially suppress the distortion component of the detection signal. The hysteretic comparator may be coupled to the high-pass filter and configured to generate the reconstructed data signal based on the intermediate signal by restoring low-frequency content of the data component that is partially suppressed by the high-pass filter.

In accordance with yet another aspect, there is provided an optical receiver comprising a photodetector, an amplifier, an ac coupling circuit and a signal compensation circuit. The photodetector may generate a detection signal representative of an optical data signal received at the photodetector and having a distortion component caused by an operating characteristic of the photodetector and a data component. The amplifier may amplify the detection signal to generate an amplified detection signal. The ac coupling circuit may be coupled to the amplifier and configured to substantially suppress the distortion component of the detection signal. The signal compensation circuit may generate a reconstructed data signal to represent the data component of the detection signal and may comprise a hysteretic comparator configured to generate the reconstructed data signal based on the amplified detection signal by restoring low-frequency content of the data component that is partially suppressed by the ac coupling circuit.

BRIEF DESCRIPTION OF THE DRAWINGS

A detailed description of various embodiments is provided herein below with reference, by way of example, to the following drawings, in which:

FIG. 3C is a schematic diagram of an alternative embodiment of the signal compensation circuit in FIG. 3B, in which the feedback filter has been omitted;

Figure 1A:
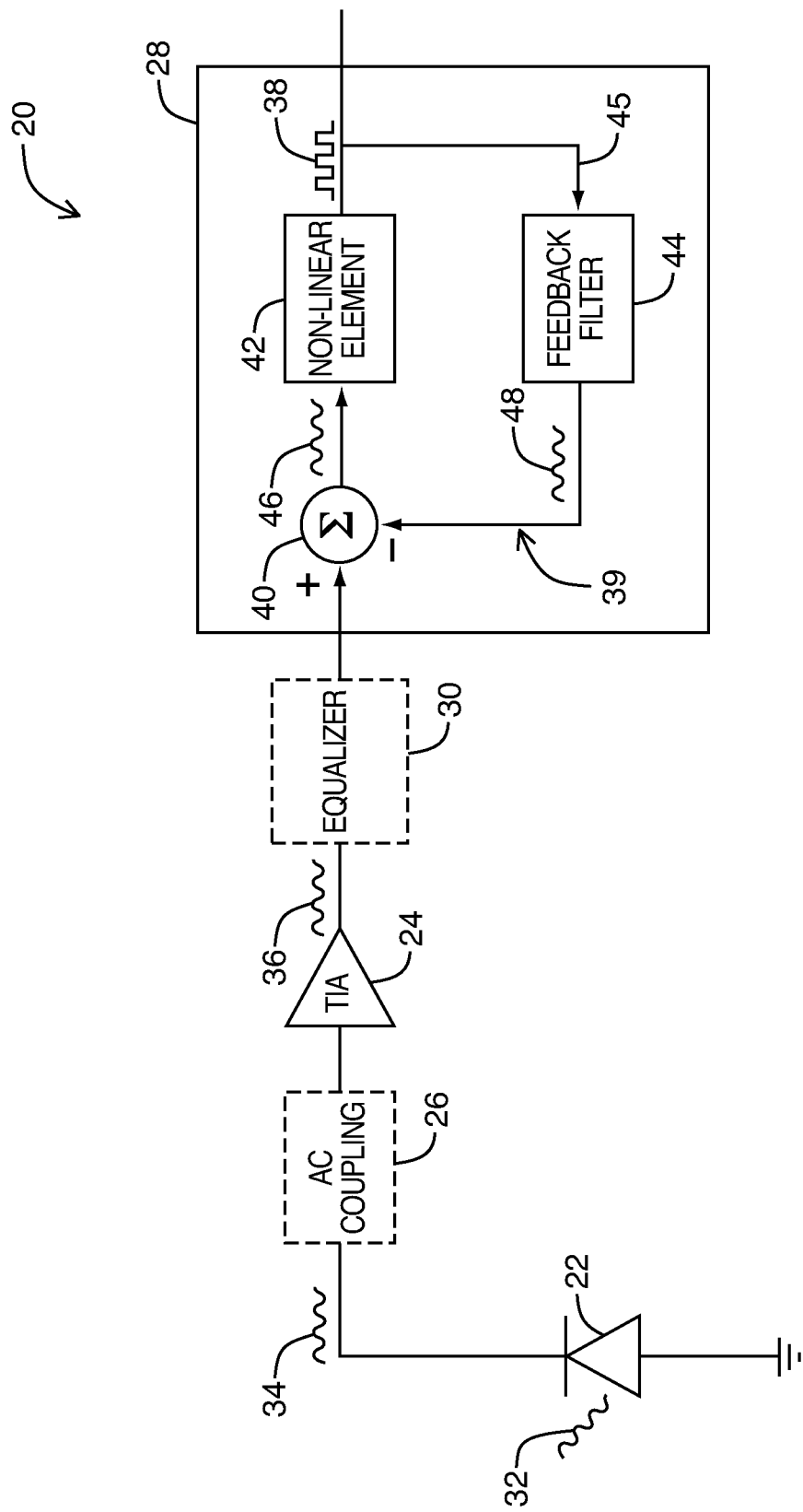
FIG. 1A is a schematic diagram of an embodiment of an optical receiver

It will be understood that reference to the drawings is made for illustration purposes only, and is not intended to limit the scope of the embodiments described herein below in any way. For convenience, reference numerals may also be repeated (with or without an offset) in the figures to indicate analogous components or features.

DETAILED DESCRIPTION OF EMBODIMENTS

Although CMOS and other integrated photodetectors may conveniently minimize use of bond wires and reduce overhead, these types of photodetectors tend to generate significantly distorted detection signals due to their particular mechanisms of detection. Most light photons incident on the photodetector are absorbed either in the depletion region of the photodetector or deep into the underlying substrate depending on the penetration depth of the photon. Charge carriers generated within the depletion region are transported to the photodetector terminals relatively quickly through carrier drift in the presence of the reverse biased electric field applied to the pn junction. However, those charge carriers generated deep in the underlying substrate are transported initially through carrier diffusion until the charge carriers reach the depletion region, after which point carrier drift again becomes the dominant mode of charge carrier transport to the given photodetector terminal. Compared to the drift velocity of electrons and holes in the presence of an electric field, diffusion tends to be an extremely slow transport process.

The penetration depth through silicon of 850-nm light, which is commonly employed in many present optical data systems, is much greater than the 1-2 µm depth of the depletion regions typically found in many standard IC technologies. For example, CMOS and many SiGe BiCMOS manufacturing processes utilize depletion regions of these or approximately these dimensions. Consequently, most photons of light incident upon photodetectors fabricated using CMOS or SiGe BiCMOS processes are absorbed deep in the underlying silicon substrate where the resulting carriers are generated. These carriers slowly diffuse to the depletion region of the pn junction for transport to the photodetector terminals. The slow diffusion mechanism tends to limit the available data rates of CMOS and SiGe BiCMOS photodetectors to only a few hundreds of megabits per second (Mbps), assuming no form of downstream signal compensation is performed, because the long tail of the diffusion currents associated with one detection signal can interfere with and distort the waveform of subsequent detection signals. For many present optical systems operating at data rates on the order of gigabits per second (Gbps), the maximum available data rate of the CMOS or SiGe BiCMOS photodetector may be unacceptably slow. Accordingly, without some form of signal compensation, it may be preferable instead to use a standalone photodetector (which may be fabricated using other technologies that do not generally suffer from the same data rate limitations).

Several approaches are available to eliminate the negative effects of the slow diffusive carriers in order to improve the speed of monolithically integrated photodetectors. For example, applying an extremely high reverse bias voltage to the pn junction, perhaps even higher than the available power supplies, can sometimes improve detector performance by extending the depth of depletion region. By making the depletion region deeper so that a greater proportion of the incident photons are absorbed within the depletion region, as opposed to within the underlying silicon substrate, many of the slow diffusive carriers can be eliminated altogether and replaced with comparatively fast drift carriers. Generally higher data rates may therefore be achieved. However, this approach can seriously impact the reliability of the detector, for example, by creating a risk of the large reverse bias causing the photodetector to undergo reverse breakdown resulting in large reverse currents and, hence, overheating.

Another approach to limiting the effects of slow diffusive current is to introduce an electrically insulating layer between the photodetector and the charge carriers generated deep in the underlying semiconductor substrate, thereby shielding the photodetector from the slow diffusive carriers. Generally, this approach is only partially effective in preventing transport of the slow diffusive carriers to the photodetector terminals, and may also require additional fabrication steps that increase the overall cost of manufacture of the IC photodetector.

Yet another approach to eliminating the slow diffusive carriers involves the use of a spatially modulated light (SML) detector having alternately covered and exposed photodiodes. When light is incident on the surface of the SML detector, charge carriers generated in the depletion regions of the exposed photodiodes are almost immediately collected, while those charge carriers generated deep in the silicon substrate underlying the exposed photodiodes will slowly diffuse toward the surface. Only very few if any charge carriers of either kind, fast drift carriers or slow diffusive carriers, are generally created in the covered photodiodes. However, if the spatial distribution of the covered and exposed photodiodes is balanced, the slow diffusive carriers generated in the exposed photodiodes may have approximately equal probability of reaching the depletion regions of either the exposed or the covered photodiodes. The total current measured at the covered photodiodes may then approximately represent the component of the current measured at the exposed photodiodes that is due to slow carrier diffusion. Subtracting these two currents then effectively cancels the slow diffusive carriers from the current measured at the exposed photodiodes.

It is evident, however, that this approach can severely limit the optical sensitivity of the SML detector due to the portion of optical data signal incident on the covered photodiodes that does not get measured. A low-noise transimpedance amplifier at the output of the photodetector may therefore be required in some SML detectors to boost signal strength. For example, it may be necessary for the transimpedance amplifier to be capable of amplifying detection currents produced by the photodetector of as low as a few microamperes, and additionally with good signal to noise ratio and common mode rejection in order to limit the extent of sensitivity degradation in the photodetector. As the performance requirements of the low-noise transimpedance amplifier can drive up cost and overall complexity, use of an SML detector may not always be appropriate.

As described herein, an optical receiver is provided in which a signal compensation circuit comprising a decision feedback equalizer may be used to increase the effective data rate of monolithically integrated photodetectors. The decision feedback equalizer may be configured by inclusion of a control module, for example, to match one or more operating characteristics of the photodetector, so that a feedback compensation signal modeling or otherwise reproducing a distortion component of the photodetector detection signal is generated by the signal compensation circuit. In some embodiments, the feedback compensation signal may be generated using a plurality of feedback filters, each matched to a different characteristic part of the distortion component, so that the feedback compensation signal is synthesized piece by piece or component by component. In other embodiments, depending on the particular configuration of the decision feedback equalizer, the feedback compensation signal may be generated without the use of a feedback filter. An amplified detection signal may then be compensated by canceling the distortion component of the photodetector detection signal using the feedback compensation signal, thereby allowing the optical data signal to be reconstructed with the distortion component substantially suppressed. As an example, the control module may configure the decision feedback equalizer to almost fully compensate for the slow diffusive carriers typical of CMOS or SiGe BiCMOS photodetectors. Temperature effects and other operating or environmental conditions of the optical receiver may also be compensated using real-time, feedback control in the control module. Data rates of 5 Gbps or more may then be realized using integrated photodetectors.

Figure 1B:
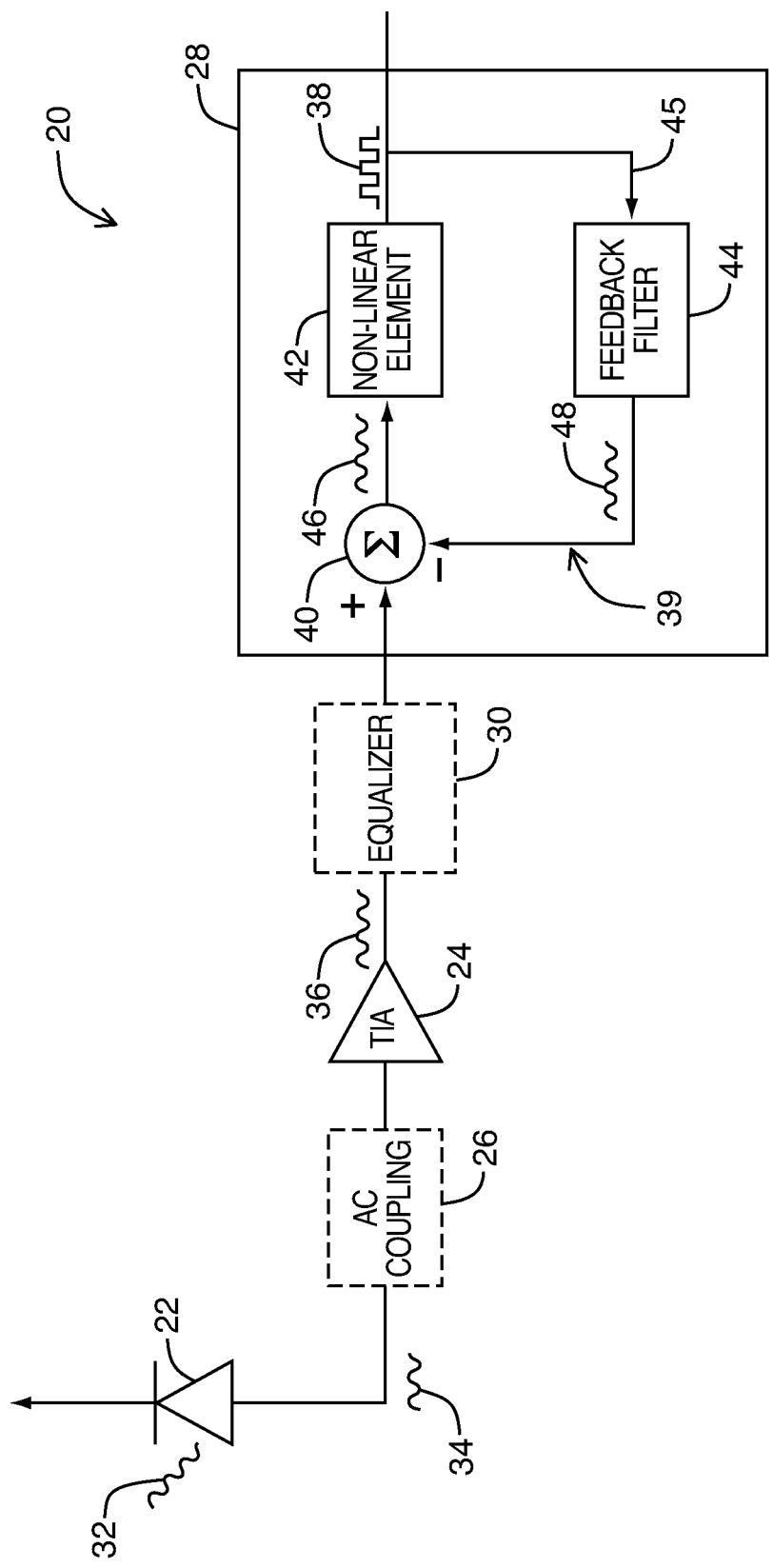
FIG. 1B is a schematic diagram of an alternative embodiment of the optical receiver shown in FIG. 1A.

Referring initially to FIGS. 1A and 1B, there is illustrated a schematic diagram of an optical receiver 20. The optical receiver 20 comprises photodetector 22 coupled to amplifier 24, optionally, by way of ac coupling circuit 26. Amplifier 24 is also coupled to signal compensation circuit 28, optionally, by way of equalizer 30. Thus, the photodetector 22 and the amplifier 24 may be directly coupled together in some cases, as may be the amplifier 24 and signal compensation circuit 28 in some cases. The optical receiver 20 may be implemented in each of CMOS and SiGe BiCMOS processes on a single semiconductor substrate, so that the photodetector 22 is monolithically integrated with the amplifier 24 and the signal compensation circuit 28. However, it should be appreciated that the signal compensation circuit 28 may be used in alternative configurations of the optical receiver 20 as well, for example, configurations in which the photodetector 22 is implemented as a standalone device or otherwise not monolithically integrated with the amplifier 24 and the signal compensation circuit 28.

Photodetector 22 is exposed to an optical data signal 32, which is transmitted to the photodetector 22, for example, through a fiber optic link or other optical communication channel. In response, the photodetector 22 generates a detection signal 34 that is representative of the received optical data signal 32. The detection signal 34 can include a data component, corresponding to data or other information encoded in the optical data signal 32, as well as a distortion component introduced by the photodetector 22. The distortion component may be caused by one or more operating characteristics or conditions of the photodetector 22. If the ac coupling circuit 26 is included in the optical receiver 20, the detection signal 34 is passed to the amplifier 24 by way of the ac coupling circuit 26; otherwise the detection signal 34 may be passed directly to the amplifier 24. In some embodiments, the amplifier 24 may be a transimpedance amplifier (TIA). The amplifier 24 amplifies the detection signal 34 into an amplified detection signal 36, which is passed to the signal compensation circuit 28 for signal processing, in some cases, intermediately through equalizer 30. Signal compensation circuit 28 receives the amplified detection signal 36 and generates a reconstructed data signal 38, corresponding to the optical data signal 32 received originally at the photodetector 22, based on the amplified detection signal 36. When the signal compensation circuit 28 is properly matched to the photodetector 22, the reconstructed data signal 38 may be substantially free of distortion and correspond closely to the optical data signal 32.

Photodetector 22 may be implemented in one of many different IC processes as described herein, such as CMOS and SiGe BiCMOS. Thus, photodetector 22 may comprise one or more photodiodes (i.e., reverse biased pn junctions) coupled together in a silicon or other semiconductor substrate to form a cathode and anode for collecting charge carriers to generate the detection signal 34. In some cases, the photodetector 22 may be a spatially modulated light (SML) detector, in which case the photodetector 22 may create a pair of differential detection signals. Moreover, the amplifier 24 and the ac coupling circuit 26 may be fully differential, and the optical receiver 20 may further include a subtractor (not shown) coupled on the output of the amplifier 24 to generate the detection signal 34 by subtracting the differential detection signals. In any case, the cross-sectional area of photodetector 22 may be sized for interfacing with the optical communication link. For example, the area of photodetector 22 may equal or approximately equal 75 µm×75 µm to facilitate coupling with multimode fibers. Also, the reverse bias voltage supplied to the photodetector 22 may be relatively large, for example about 3.3V, so that the optical receiver 20 may simultaneously achieve wide bandwidth and good overall responsiveness.

As shown in FIG. 1A, in some embodiments, the cathode of the photodetector 22 may be connected to the amplifier 24 or ac coupling circuit 26 and the anode may be connected to a negative power supply terminal (e.g., ground). However, as shown in FIG. 1B, according to some alternative embodiments, the anode of the photodetector 22 may instead be connected to the amplifier 24 or ac coupling circuit 26, in which case the cathode may be connected to a positive supply terminal (e.g., Vdd of a voltage supply). The detection signal 34 generated according to either configuration of the photodetector 22 may include a data component and a distortion component, as described herein. The distortion component may be substantially suppressed by the signal compensation circuit 28 regardless of how the photodetector 22 is reverse biased.

Figure 2A:
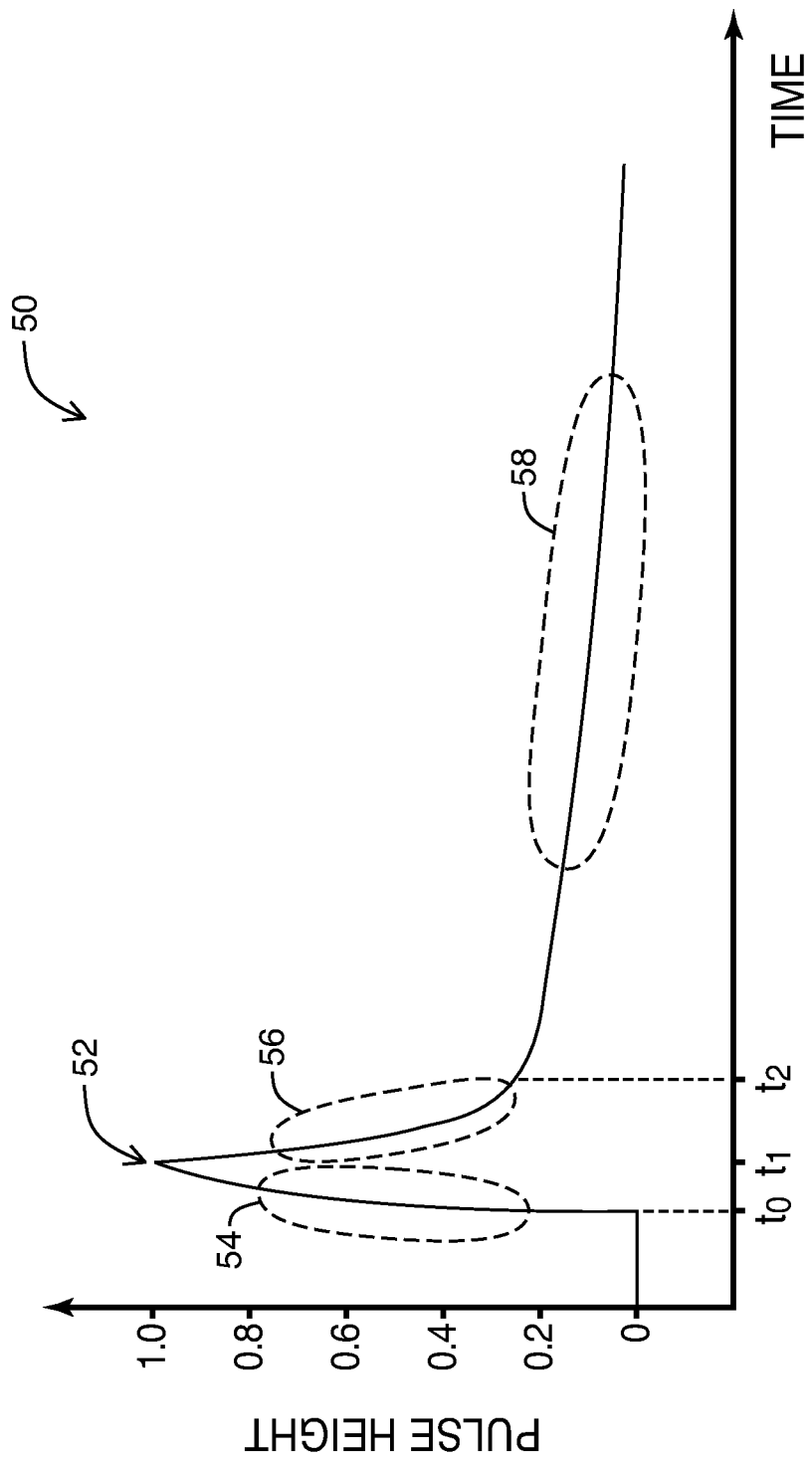
FIG. 2A is a graph of a typical pulse response for the photodetector illustrated in FIGS. 1A and 1B when implemented using CMOS or SiGe BiCMOS.

Referring now to FIG. 2A, there is illustrated a graph 50 showing a typical pulse response for the photodetector 22 when implemented using CMOS or SiGe BiCMOS. The graph 50 plots time on the x-axis against normalized pulse height on the y-axis. Curve 52 on graph 50 represents the amplitude of the detection current induced in the photodetector 22 by a narrow pulse of light received at time, $t_0$, and lasting until about $t_1$. For illustrative purposes, the amplitude of curve 52 is represented in arbitrary units normalized to the height of the received pulse of light. Thus, it should be appreciated that curve 52, because it is normalized, may represent either the detection signal 34 generated by the photodetector 22 or the amplified detection signal 36 generated by the amplifier 24, as the case may be.

In can be seen that different portions of curve 52 are characterized by potentially significantly different time constants. Curve 52 rises quickly according to a relatively small time constant during interval 54, which is defined between $t_0$ and $t_1$, when the narrow pulse of light is incident on the photodetector 22. After reaching a maximum pulse height at or about $t_1$, corresponding roughly to the end of the received pulse of light, curve 52 begins to drop back down toward zero. The rate of decay is relatively quick during interval 56, which is defined between about $t_1$ and $t_2$, according to the same relatively small time constant that characterizes the interval 54. A normalized amplitude of approximately 0.2 at $t_2$ may be typical for the curve 52, though the normalized amplitude at $t_2$ may also vary depending on how the optical receiver 20 and the photodetector 22 are configured. At or around $t_2$, however, curve 52 begins to decay much slower than in the interval 56 and continues to decay during interval 58 according to a relatively large time constant, as compared to the relatively small time constant in intervals 54 and 56. Thus, curve 52 may be characterized by a relatively small time constant during intervals 54 and 56, but a relatively large time constant during interval 58 by comparison. As a result, the tail component of curve 52 (i.e., intervals 56 and 58) has both a fast and slow portion.

The different time constants characterizing the curve 52 during the different time intervals may correspond to different operating characteristics of the optical receiver 20 that predominate at different times. During intervals 54 and 56, when curve 52 rises and falls relatively quickly, the response of the photodetector 22 may reflect generation large drift currents, but also bandwidth limitations of the amplifier 24. More specifically, when pulses of light are incident on the photodetector 22, the drift current generated within the depletion region of the photodetector 22 is large by comparison with the diffusive current generated deep in the underlying silicon substrate. It should be noted that diffusive carriers may be present simultaneously during intervals 54 and 56, but are not as dominant as the drift current. The shape of the curve 52 during intervals 54 and 56 therefore reflects the faster speed of drift current. At the same time, the curve 52 during intervals 54 and 56 may also be rate limited by the bandwidth limitations of the amplifier 24. (From the standpoint of the photodetector 22, the input impedance of the amplifier 24 represents an effective load on the photodetector 22.) Thus, the rate of change of curve 52 during intervals 54 and 56 may also be subject to the finite bandwidth of the amplifier 24, which generally has a low-pass characteristic. If included in the optical receiver 20, the optional ac coupling 28 may also rate limit the curve 52.

By about $t_2$, substantially all of the drift current generated in the photodetector 22 has been collected in and cleared from one of the photodetector terminals, leaving the comparatively slow diffusion current as the dominant component of curve 52. Thus, curve 52 assumes a comparatively large time constant beyond $t_2$ as curve 52 tends toward zero. As suggested by FIG. 2, the time constant of the diffusion current in some embodiments may be quite a bit larger than the time constant of the drift current. For example, the time constant of the diffusion current may be as much as two orders of magnitude slower. Combined with the fact that the undetected diffusion current at $t_2$ can be sizable (i.e., about 20% of the maximum induced current), the tail component of curve 52 may have an exceptionally slow decay during interval 58 following the relatively fast decay during interval 56. Measured in terms of pulse widths, a decay lasting for one hundred or more pulses would not be uncommon for a photodetector fabricated in present IC technologies. As will be explained further below, the composite nature of the tail component having both a fast and slow portion, which is typical of an integrated photodetector, may be taken into account in the signal compensation circuit 28.

The received optical data signal 32 may comprise data or other information encoded within a sequence of light pulses. Unless the data rate of the optical data signal 32 is slow enough, the tail component of the diffusion current associated with one received pulse of light in the sequence may interfere with the waveform of subsequently received pulses of light in the sequence. In other words, with a fast enough data rate, those subsequent pulses of light may be received at the photodetector 22 before the diffusion current associated with one or more previous pulses has had sufficient time to decay to zero. Thus, to transmit the optical data signal 32 at a reasonably high data rate, the detection signal 34 generated by the photodetector 22 may generally include a distortion component, in addition to a data component (corresponding to the encoded data or other information). As noted previously, the distortion component is attributable at least partly due to the diffusion current induced in the photodetector 22. The signal compensation circuit 28 may be optimized to compensate for the undesirable diffusion current when reconstructing the optical data signal 32. Larger effective data rates, in some cases of 5 Gbps or more, therefore become realizable in IC photodetectors. These large effective data rates may be realized simultaneously with the other associated advantages of IC photodetectors mentioned previously, such as size and noise performance.

Referring back to FIGS. 1A and 1B, ac coupling circuit 26 may be implemented with a resistor-capacitor network arranged so as to couple a high-frequency component of the detection signal 34 to the input of the amplifier 24. For example, the ac coupling circuit 26 may include a combination of a capacitor connected in series between the photodetector 22 and the amplifier 24, and a resistor connected between the photodetector 22 and a positive supply terminal (e.g., a dc voltage) to maintain a suitable reverse bias across the photodetector 22. If the photodetector 22 is an SML detector, the ac coupling circuit 26 may include a combination capacitor and resistor for coupling each differential detection signal generated by the photodetector 22 into a corresponding differential input of the amplifier 24. To adjust the overall frequency response of the optical receiver 20, the ac coupling circuit 26 may further include one or more resistors connected between the input of the amplifier 24 and the power supply or supplies of the optical receiver 20. Again, if the photodetector 22 is an SML detector, one or more resistors may be connected to each differential input of the amplifier 24.

While FIGS. 1A and 1B show the ac coupling circuit 26 included between the photodetector 22 and the amplifier 24, the relative positions of the ac coupling 26 and amplifier 24 may be reversed. Accordingly, in some embodiments, the photodetector 22 is coupled to the input of the amplifier 24 and the output of the amplifier 24 is coupled to the ac coupling circuit 26.

Figure 2B:
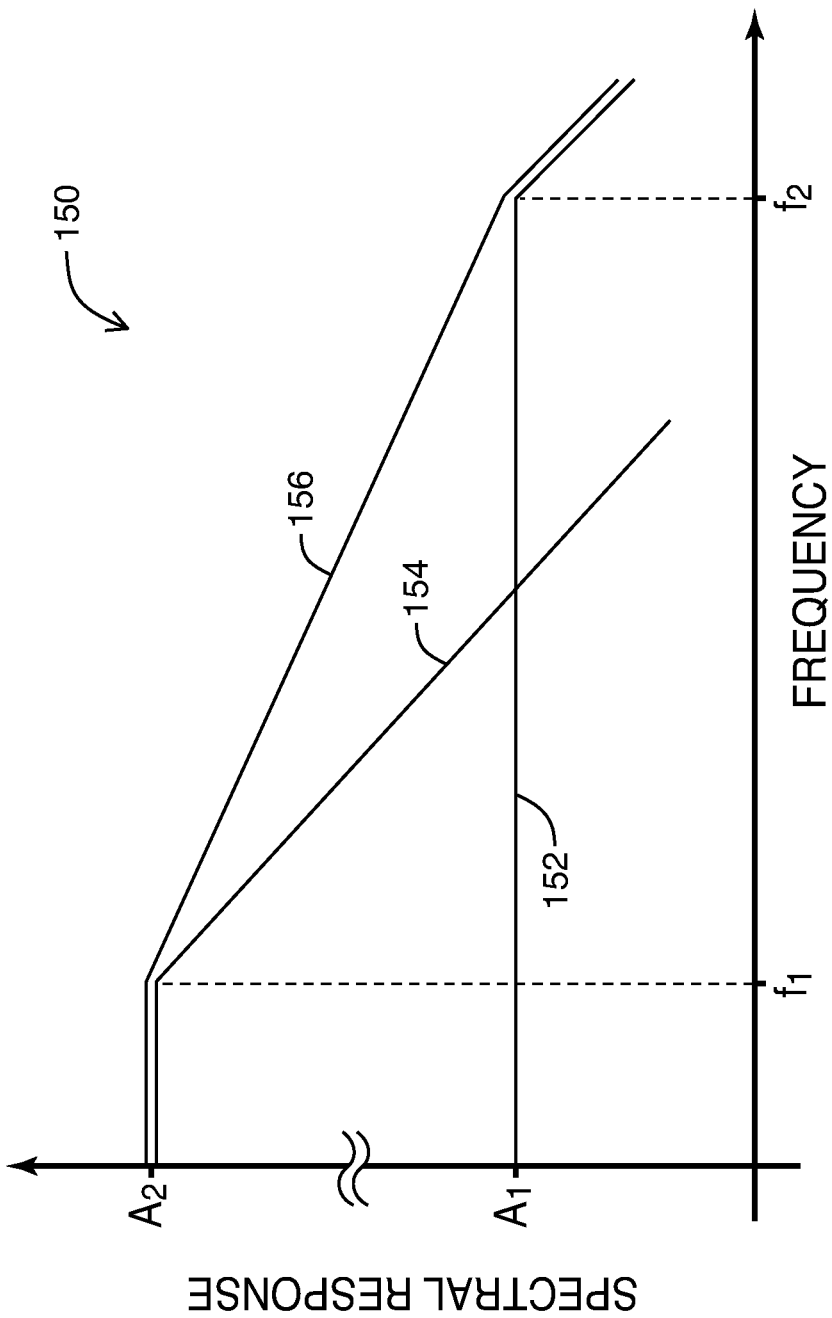
FIG. 2B is a graph of a typical spectral response for the photodetector illustrated in FIGS. 1A and 1B when implemented using CMOS or SiGe BiCMOS.

Referring now to FIG. 2B, there is illustrated a graph 150 showing a typical spectral response of the photodetector 22 shown in FIGS. 1A and 1B when implemented in CMOS or SiGe BiCMOS. The graph 150 plots frequency (f) logarithmically on the x-axis against spectral response (dB) on the y-axis. Curve 152 on the graph 150, which is defined by a relatively low amplitude $A_1$ and high bandwidth $f_2$, represents a fast response corresponding to drift current in the photodetector 22. However, the bandwidth $f_2$ of the fast response may also be limited by the finite bandwidth of the amplifier 24, as noted above. Curve 154 on graph 150, which is defined by a relatively high amplitude $A_2$ and low bandwidth $f_1$, represents a slow response corresponding to diffusion currents in the photodetector 22. Curve 156 is the mathematical sum of curves 152 and 154 and, as each of drift and diffusion current in the photodetector 22 contributes a component of the detection signal 34, therefore represents an overall response of the photodetector 22. When the optical data signal 32 received at the photodetector 22 has a broadband frequency spectrum, which would be the case when the optical data signal 32 contains a random data pattern transmitted at a rate approximately equal to or higher than $f_2$, for example, the resulting spectrum of the detection signal 34 will have the same or similar characteristics as the overall response of the photodetector 22 represented by curve 156. However, it should be appreciated that curve 156, like curves 152 and 154, is representative only and may not be drawn to scale.

If included in the optical receiver 20, capacitance and resistance values of the ac coupling circuit 26 may be selected so as to attenuate low-frequency components of the detection signal 34 represented in FIG. 2B by curve 154. For example, the capacitance and resistance values may be selected so as to attenuate the slow diffusion current appearing in the detection signal 34, which occurs at low frequency compared to the data rate of the optical data signal 32. At the same time, however, some attenuation of the faster drift currents, which are mostly responsible for transmitting the encoded data component of the optical data signal 32, may also occur. Inclusion of the ac coupling circuit 26 may therefore attenuate both the distortion and data components of the detection signal 34. Signal compensation circuit 28 may be used to restore some of the low-frequency content of the data component lost due to attenuation in the ac coupling circuit 26, thereby reconstructing the optical data signal 32 originally received at the photodetector 22. As will be seen, signal compensation circuit 28 may compensate for the effects of ac coupling either with or without the use of feedback filters.

Referring back to FIGS. 1A and 1B, amplifier 24 may in some cases be a transimpedance amplifier (TIA) having a large feedback resistor selected to achieve a high transimpedance gain. As a result, the amplified detection signal 36 generated by the amplifier 24 may be large relative to the noise contributions from one or more downstream components of the optical receiver 20, which results in the reconstructed data signal 38 having generally good signal-to-noise ratio. While increasing transimpedance gain, however, the large feedback resistor may also decrease the effective bandwidth of the amplifier 24, which varies inversely proportional to the size of the feedback resistor as approximated by:

$$BW = \frac{A_c}{2\pi R_F C_{in}}, \quad (1)$$

where: $A_c$ represents the open-loop gain of the amplifier 24, $C_{in}$ represents the equivalent capacitance at the input to the amplifier 24, and $R_F$ represents the feedback resistance. Increasing the open-loop gain $A_c$ may counteract some of the bandwidth reduction due to selection of a large feedback resistor $R_F$, but may also lead to gain peaking in the frequency response of the amplifier 24 if an insufficient phase margin results. A feedback capacitor in parallel with the feedback resistor $R_F$ may eliminate or reduce the gain peaking, but may also result in further bandwidth reduction.

Alternatively, a negative Miller capacitance may be incorporated into the core of the amplifier 24 as a way of extending an internal pole of the amplifier 24 and thereby increasing the effective bandwidth of the amplifier 24. Extension of the internal pole may also tend to increase the phase margin of the amplifier 24, thereby allowing the open-loop gain $A_c$ to be increased without negatively impacting on the overall stability of the amplifier 24.

Signal compensation circuit 28 may be configured, as shown in FIGS. 1A and 1B, to include a decision feedback equalizer 39 implemented using a summer 40, a non-linear element 42 and a feedback filter 44 coupled together to form a feedback compensation loop 45. The non-linear element 42 may be included in the forward branch of the feedback compensation loop 45 and configured to generate the reconstructed data signal 38 by transformation of a compensated detection signal 46 generated by the summer 40. The feedback filter 44 may be included in the reverse branch of the feedback compensation loop 45 and configured to generate a feedback compensation signal 48 from the reconstructed data signal 38. The summer 40 may then be configured to generate the compensated detection signal 46 by subtracting the feedback compensation signal 48 provided by the feedback filter 44 from the amplified detection signal 36 provided by the amplifier 24.

The signal compensation circuit 28 may be configured differently according to whether or not the ac coupling circuit 26 is included in the optical receiver 20 and depending on the particular configuration of the non-linear element 42. As will be explained further below, in some embodiments, the feedback filter 44 may optionally be omitted from the decision feedback equalizer 39 depending on the particular configuration of the non-linear element 42. The non-linear element 42 also may be configured differently depending on whether or not the ac coupling circuit 26 is included.

The amplified detection signal 36 includes both a data component and a distortion component, for example, due to the slow tail component of the diffusion current generated in the photodetector 22. To reconstruct the optical data signal 32 from the detection signal 34 generated by the photodetector 22, the signal compensation circuit 28 generates the feedback compensation signal 48 to model the distortion component of the amplified detection signal 36. The feedback compensation signal 48 is then used to cancel the distortion component of the amplified detection signal 36 when the feedback compensation signal 48 is subtracted from the amplified detection signal 36 in the summer 40. To provide an accurate reproduction of the distortion component of the amplified detection signal 36, the decision feedback equalizer 39 may implement a transfer function modeling the distortion response of the photodetector 22 to a short pulse of light. Accordingly, the decision feedback equalizer 39 may be matched to one or more operating characteristics of the photodetector 22 being modeled that introduces distortion to the detection signal 34 and, consequently, the amplified detection signal 36 as well. Operation of the signal compensation circuit 28 can be understood intuitively.

It may be assumed that the amplified detection signal 36 is representative of a continuous bit pattern encoded into the optical data signal 32, and that any transients in the feedback loop have substantially settled, so that the signal compensation circuit 28 is operating in or near a steady state. If the feedback filter 44 has been properly matched to the photodetector 22, the reconstructed data signal 38 will comprise a bit pattern identical to the bit pattern encoded originally in the optical data signal 32, once the signal compensation circuit 28 settles and achieves steady state. As a result, the input to the feedback filter 44 (i.e., the reconstructed data signal 38) will be in the form of a sequence of short pulses corresponding closely to the sequence of pulses received at the photodetector 22. As the transfer function implemented in the feedback filter 44 models the distortion component of the amplified detection signal 36 due to a single short pulse of light, the output signal generated by the feedback filter 44 (i.e., the feedback compensation signal 48) will effectively reproduce the distortion component of the amplified detection signal 36 for the entire particular bit pattern encoded within the optical data signal 32. By comparing the amplified detection signal 36 with the feedback compensation signal 48 using the summer

40, the distortion component of the amplified detection signal 36 may be substantially eliminated from the compensated detection signal 46.

Equalizer 30 may be a filter or other signal processing element configured to provide high-frequency boosting of the amplified detection signal 36 when the equalizer 30 is included in the optical receiver 20. For example, in some embodiments, equalizer 30 may apply shelf filtering so that high-frequency components of the amplified detection signal 36 are amplified relative to low-frequency components. However, other and more complex filter functions may also be utilized in some embodiments to provide the amplified detection signal 36 with high-frequency boosting.

Non-linear element 42 may then be used for shaping of the compensated detection signal 46 into a square wave pattern to provide the reconstructed data signal 38. In this way, the reconstructed data signal 38 may be effectively a continuous-time digital signal, which may then be provided to an analog to digital converter or other digital component, such as a simple latch (not shown), if desired, for sampling and conversion into a discrete-time digital signal. The order of the feedback filter 44 may be selected depending on the required accuracy of the feedback compensation signal 48. Theoretically, non-linear element 42 could be omitted altogether if the feedback filter 44 is of a sufficiently high order and designed to provide enough accuracy so that complete distortion cancellation is achieved. This situation would be indicated, for example, by the compensated detection signal 46 being already essentially an ideal pulse train without the use of further shaping in the non-linear element 42. In that case, the compensated detection signal 46 could be provided directly as the reconstructed data signal 38 (and thus also to the input of the feedback filter 44.) However, in some embodiments, inclusion of the non-linear element 42 may ease requirements for the order of the feedback filter 44, which may result in generally simpler and more cost-effective implementations. The quantizing function of the non-linear element 42 may also contribute to a faster overall response for the signal compensation circuit 28. As will be explained more below, inclusion of the non-linear element 42 may also provide a basis for calibration and control of the decision feedback equalizer 39.

Figure 3A:
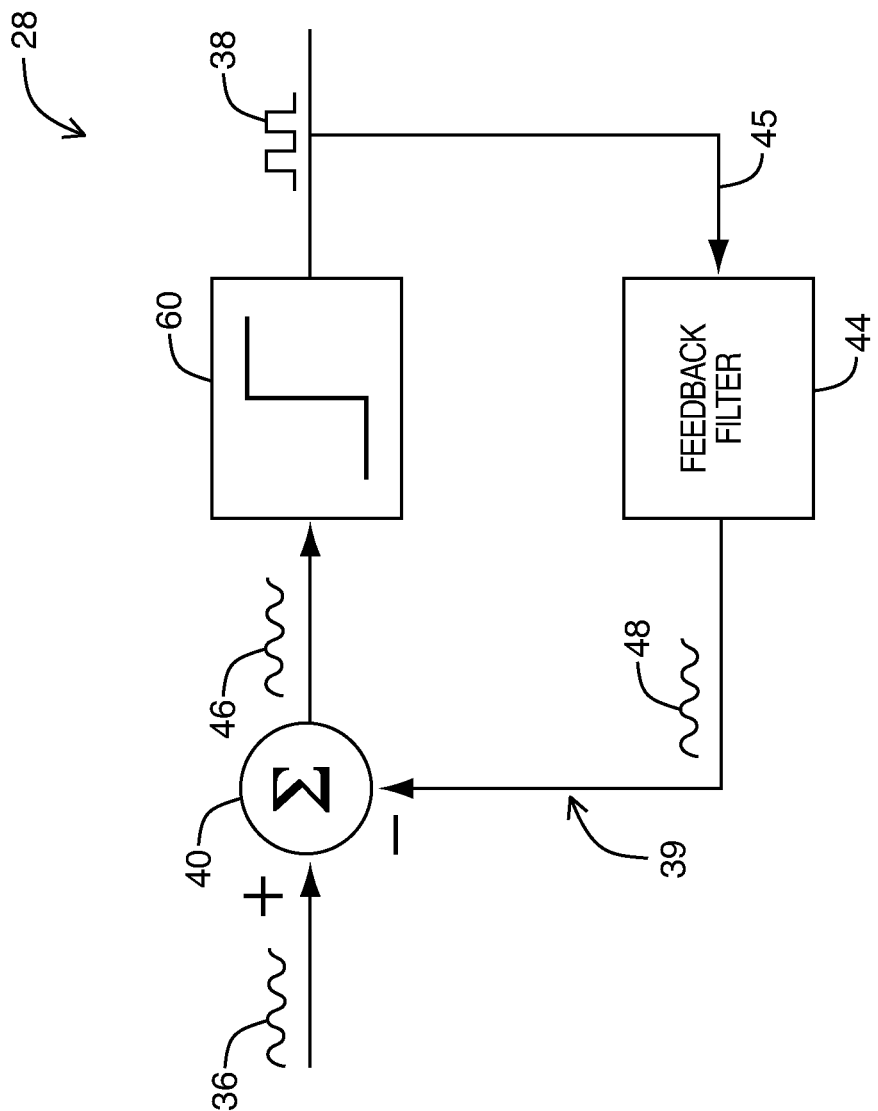
FIG. 3A is a schematic diagram of an embodiment of the signal compensation circuit illustrated in FIGS. 1A and 1B, in which the non-linear element includes a signal quantizer.

Referring now to FIG. 3A, in some embodiments, the signal compensation circuit 28 may be implemented using a signal quantizer 60 to realize the non-linear element 42. Signal quantizer 60 may be a binary (i.e., two-level) quantizer implemented using a high-gain comparator or differential amplifier, such as an op-amp, configured to compare the compensated detection signal 46 against an appropriate threshold level specified somewhere between the binary quantization levels of the signal quantizer 60. Thus, the output of the signal quantizer 60 may be pulled up to a high-voltage level (e.g., equal to the positive power supply) when the compensated detection signal 46 is greater than the threshold level, and pulled down to a low-voltage level (e.g., equal to the negative power supply) when the compensated detection signal 46 is less than the threshold level. The resulting quantization of the compensated detection signal 46 may generate the reconstructed data signal 38 as a pulse train wave pattern. Additional circuit components may be included in the signal quantizer 60 in some embodiments, for example, to improve the frequency response of the signal quantizer 60.

Figure 3B:
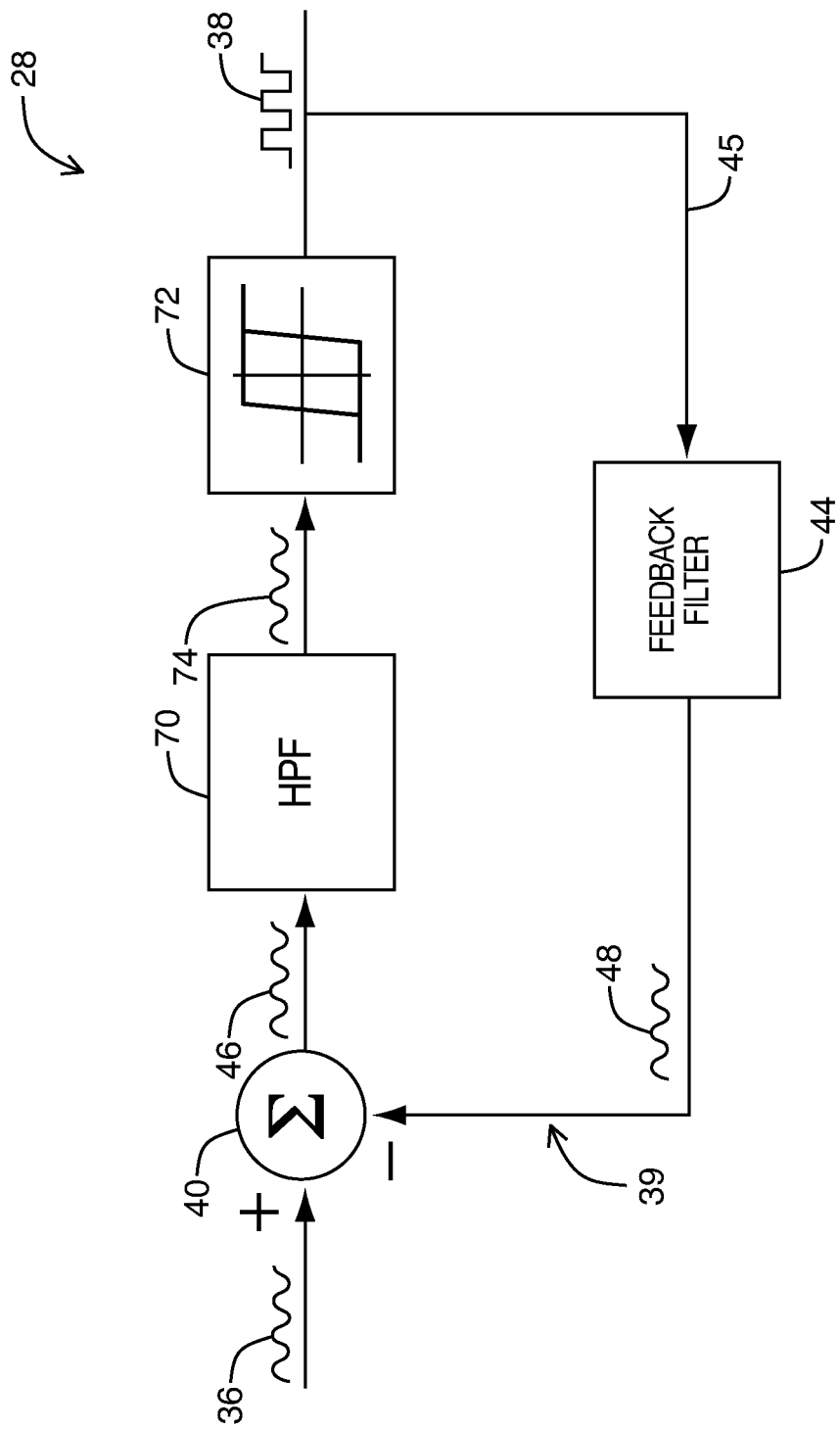
FIG. 3B is a schematic diagram of an alternative embodiment of the signal compensation circuit illustrated in FIGS. 1A and 1B, in which the non-linear element includes a filter and a hysteretic comparator.

Referring now to FIG. 3B, in some embodiments, the signal compensation circuit 28 may alternatively be implemented using a combination of filter 70 and hysteretic comparator 72 to realize the non-linear element 42. As shown in FIG. 4, filter 70 is coupled to the output of the summer 40 to receive the compensated detection signal 46 and generate an intermediate signal 74. Hysteretic comparator 72 is then coupled to the output of the filter 70 to generate the reconstructed data signal 38 from the intermediate signal 74. Filter 70 may be any suitable type of filter having a pass band designed to pass the data component of the amplified detection signal 36 while substantially suppressing the distortion component. For example, filter 70 may be a high-pass filter in some embodiments.

Hysteretic comparator 72 may function generally similar but superior to signal quantizer 60 on account of input-output hysteresis implemented in the hysteretic comparator 72. According to the input-output hysteresis, the output of the hysteretic comparator 72 may be pulled up to a high-voltage level (e.g., equal to the positive power supply) when the intermediate signal 74 rises above a first threshold level, and pulled down to a low-voltage level (e.g., equal to the negative power supply) when the intermediate signal 74 drops down below a second threshold level, which is different from and generally less than the first threshold level. If a common threshold level is used in both the upward and downward directions, as would be the case in the signal quantizer 60, then small voltage oscillations on the comparator input (e.g., due to random noise) could cause rapid transitions between the low and high voltage levels on the output of the signal quantizer 60. However, this occurrence may be prevented by specifying two different input threshold levels depending on the current state of the output, as is done in the hysteretic comparator 72 but not the signal quantizer 60. In this way, the performance of the hysteretic comparator 72 may be superior to that of the signal quantizer 60.

Referring now to FIG. 3C, in some embodiments, the signal compensation circuit 28 may alternatively be implemented using the combination of filter 70 and hysteretic comparator 72 to realize the non-linear element 42, but without the use the feedback filter 44. Accordingly, the feedback compensation loop 45 including the feedback filter 44 and the summer 40 may be omitted from the signal compensation circuit 28. With the summer 40 omitted, the amplified detection signal 36 is passed directly to the input of filter 70, which may again be any suitable type of filter (e.g., a high-pass filter) having a pass band designed to pass the data component of the amplified detection signal 36 while substantially suppressing the distortion component. In other alternative embodiments, where the ac coupling circuit 26 is included in the optical receiver 20, the filter 70 may also be omitted leaving the hysteretic comparator 72. The signal compensation circuit 28 shown in FIG. 3C otherwise functions similar to the configuration shown in FIG. 3B and will not be described in further detail.

Figure 4A:
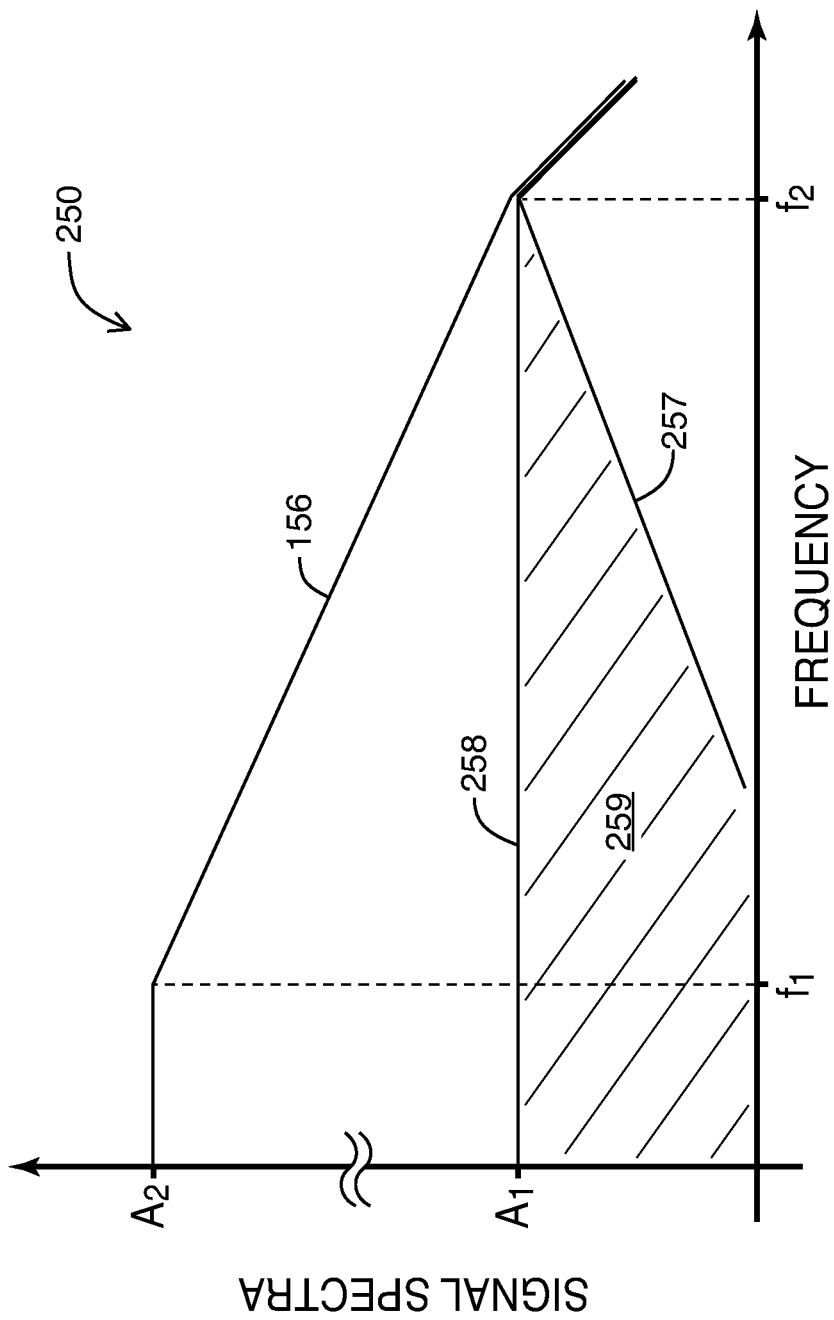
FIG. 4A is a graph showing frequency spectra of various signals generated in or operated on by the signal compensation circuit illustrated in FIGS. 3B and 3C.
Figure 4B:
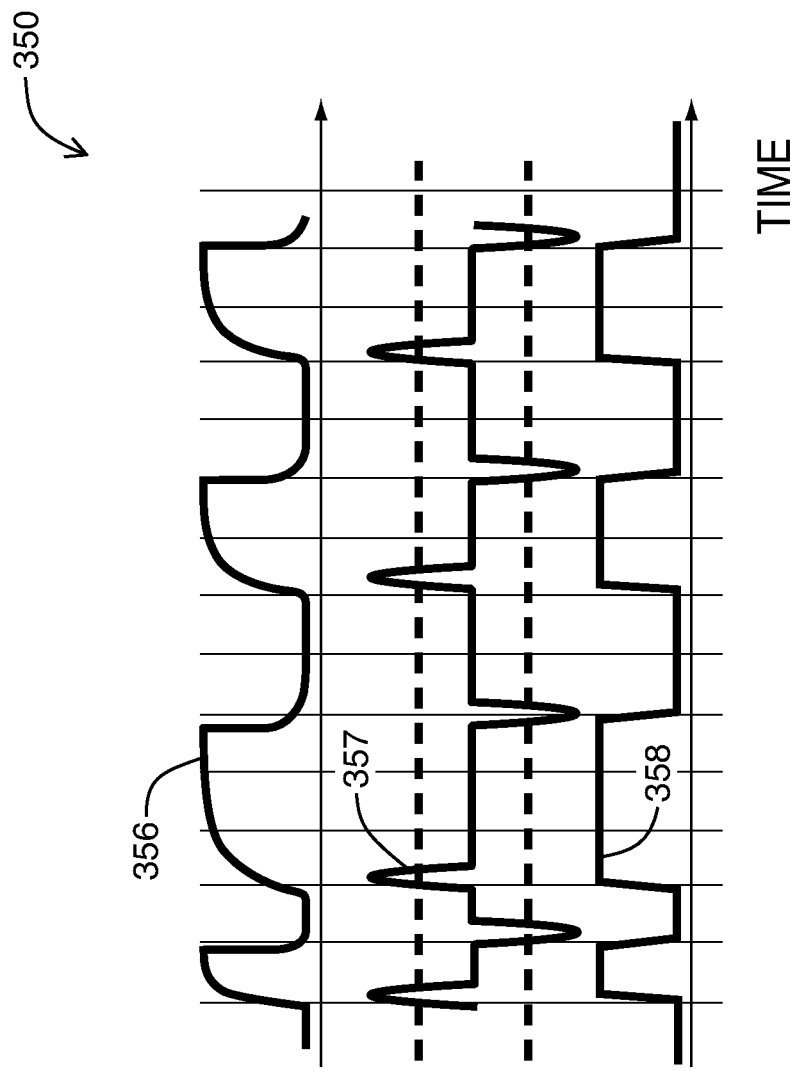
FIG. 4B is a graph showing time-domain waveforms of the various signals generated in or operated on by the signal compensation circuit illustrated in FIGS. 3B and 3C.

Referring now to FIGS. 4A and 4B, operation of the signal compensation circuit 28 shown in FIG. 3B or 3C may be further understood in terms of the frequency spectra and time-domain waveforms of various different signals generated in or operated on by the signal compensation circuit 28. In FIG. 4A, there is illustrated a graph 250 showing straight line approximations of the frequency spectra of the various different signals. Curve 156 on graph 250 represents the frequency spectrum of the amplified detection signal 36 and is the same as curve 156 on graph 150 shown in FIG. 2B. Curve 257 represents the frequency spectrum of the intermediate signal 74. Curve 258 represents the frequency spectrum of the reconstructed data signal 38. It should also be appreciated that the straight lines approximations used in curve 156, curve 257 and curve 258 are for illustrative purposes only.

As noted above, filter 70 may be any suitable type of filter having a pass band designed to pass the data component of the amplified detection signal 36 while substantially suppressing the distortion component. Accordingly, in some embodiments, filter 70 may be a high-pass filter with a cutoff frequency appropriately located to pass the fast, high-frequency component of the amplified detection signal 36 (represented by curve 152 in FIG. 2B), while suppressing the slow, low-frequency component of the amplified detection signal 36 (represented by curve 154 in FIG. 2B). For embodiments of the optical receiver 20 that include the ac coupling circuit 26, in addition or as an alternative to the filter 70, the ac coupling circuit 26 may be configured to suppress the slow, low-frequency component of the amplified detection signal 36. Accordingly, the filter 70 may in some cases be omitted from the signal compensation circuit 28.

Applying a high-pass filter characteristic to the compensated detection signal 46 (as in FIG. 3B) or the amplified detection signal 36 (as in FIG. 3C), when the amplified detection signal 36 has a frequency spectrum represented by curve 156 results in the intermediate signal 74 having a frequency spectrum approximated by curve 257. Ideally the intermediate signal 74 would have a broad frequency spectrum, equivalent to the broad frequency spectrum of the reconstructed data signal 38 (represented by curve 258), which contains both low and high frequency components. However, because neither the filter 70 or, if included, the ac coupling circuit 26 intrinsically distinguishes between the data and distortion components of the amplified detection signal 36, when the slow, low-frequency components of the amplified detection signal 36 are suppressed, some low-frequency attenuation of the data component occurs in addition to suppression of the distortion component. (This attenuation is represented on graph 250 by region 259.) The non-linear element 42 and feedback filter 44 may be utilized in the signal compensation circuit 28 to effectively restore some of the lost low-frequency content of the data component, for example, by generating the reconstructed data signal 38 through quantization of the intermediate signal 74, in some cases, making use of input-output hysteresis. Where the hysteretic comparator 72 is sufficient to restore the lost low-frequency content of the data component, the feedback filter 44 may be omitted as shown in FIG. 3C. Otherwise the feedback filter 44 may also be included in the signal compensation circuit 28 as shown in FIG. 3B.

In FIG. 4B, there is illustrated a graph 350 showing time-domain waveforms of the various signals illustrated in FIG. 4A in terms of frequency spectra. Curve 356 on graph 350 is an approximate time-domain representation of the amplified detection signal 36. Curve 357 is an approximate time-domain representation of the intermediate signal 74. Curve 358 is an approximate time-domain representation of the reconstructed data signal 38. As may be seen from FIG. 4B, the amplified detection signal 36 has the general shape of a pulse train waveform encoding a particular bit pattern, but exhibiting substantial distortion caused by the slow diffusive currents generated in the photodetector 22. On the other hand, the reconstructed data signal 38 encodes the same bit pattern as the amplified detection signal 36 without substantial distortion.

By predominantly passing the fast, high-frequency component of the amplified detection signal 36, the filter 70 generates the intermediate signal 74 having a positive-going pulse for each rising (low-to-high) transition in the amplified detection signal 36 and a negative-going pulse for each falling (high-to-low) transition in the amplified detection signal 36. In comparison to the distortion causing diffusive current, the drift current generated by the photodetector 22 tends to grow quickly at the start of a received pulse of light and decay quickly at the end of the received pulse of light. The hysteretic comparator 72 then generates the reconstructed data signal 38 as a square waveform toggled from low to high whenever a positive-going pulse observed in the intermediate signal 74 crosses the first threshold level, and subsequently toggled from high to low whenever a negative-going pulse observed in the intermediate signal 74 crosses the second threshold level. Through this process, the low-frequency content present in the data component of the amplified detection signal 36 (and subsequently attenuated by the filter 70) may be restored in the reconstructed data signal 38 without significant distortion.

Figure 5:
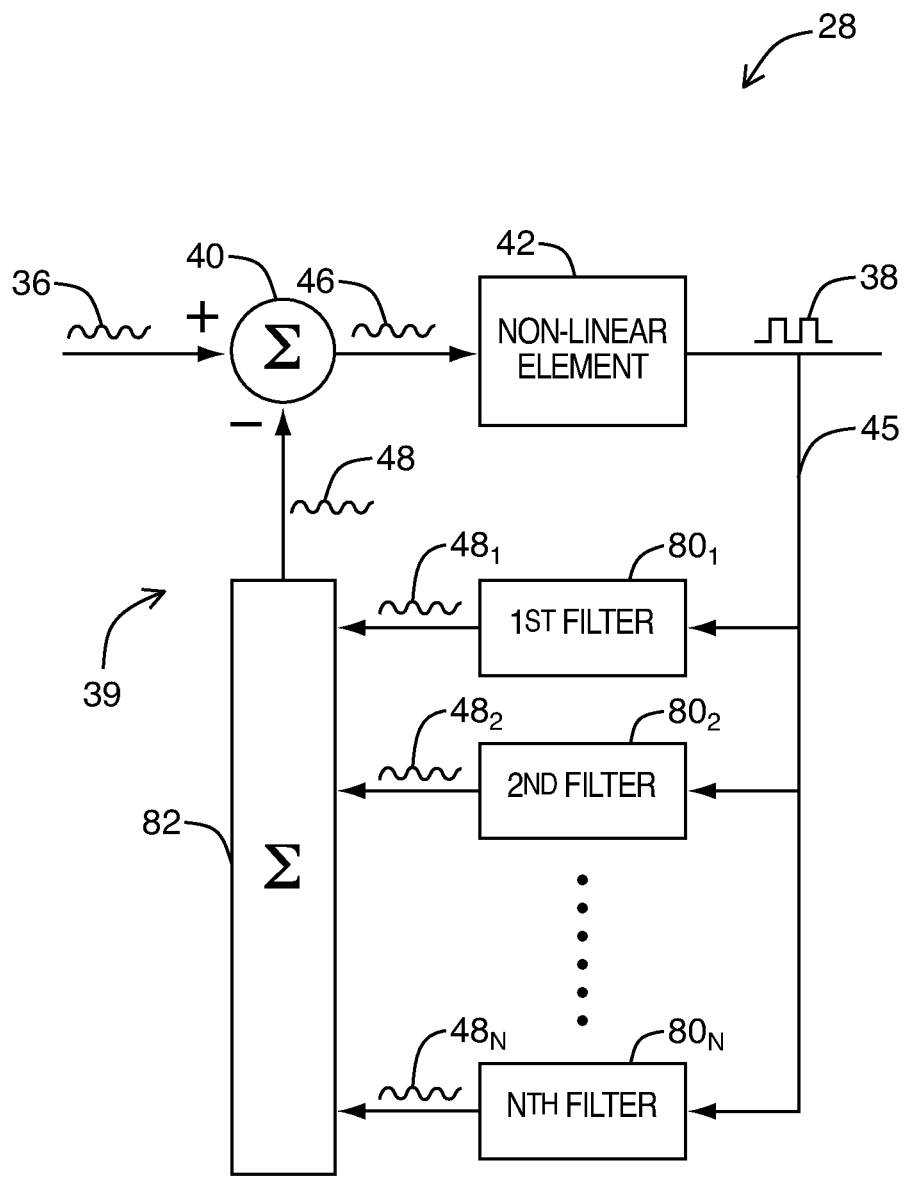
FIG. 5 is a schematic diagram of the signal compensation circuit illustrated in FIG. 1 in which a plurality of feedback filters is included.

Referring now to FIG. 5, in some embodiments, the signal compensation circuit 28 may be implemented using a plurality of component filters $80_1 \ldots 80_N$ to realize the feedback filter 44. The plurality of component filters $80_1 \ldots 80_N$ may be included in the feedback compensation loop 45 between the output of the non-linear element 42 and corresponding inputs to the summer 82, so that individual component filters in the plurality of component filters $80_1 \ldots 80_N$ are connected together in parallel configuration. Each of the plurality of component filters $80_1 \ldots 80_N$ may also be configured to generate one component feedback compensation signal, respectively, in a plurality of component feedback compensation signals $48_1 \ldots 48_N$, which are synthesized together in the summer 82 for overall generation of the feedback compensation signal 48. Though summer 82 is illustrated in FIG. 5 explicitly as a discrete component, it should be appreciated that the summer 82 could alternatively be rolled into summer 40, so that respective outputs of the plurality of component filters $80_1 \ldots 80_N$ are coupled directly into the summer 40. Thus, feedback compensation signal 48 would, in some embodiments, be implicitly generated within the summer 40.

The plurality of component filters $80_1 \ldots 80_N$ may be configured, in the aggregate, to match the one or more operating characteristics of the photodetector 22 being compensated by the signal compensation circuit 28. For example, the plurality of component filters $80_1 \ldots 80_N$ may be designed to collectively simulate a single filter (e.g., feedback filter 44 shown in FIGS. 1A and 1B) designed to reproduce the distortion component of the amplified detection signal 36. Again the distortion component may be caused by one or more operating characteristics of the photodetector 22, such as slow diffusive current associated with CMOS or SiGe BiCMOS photodetectors. For example, each individual component filter in the plurality of component filters $80_1 \ldots 80_N$ may be a single pole (i.e., first-order) low-pass filter defined by a dc gain and time constant. The dc gains and time constants of the plurality of component filters $80_1 \ldots 80_N$ may also generally differ from each other, so that each respective component feedback compensation signal in the plurality of component feedback compensation signals $48_1 \ldots 48_N$ may provide an aggregate contribution to the feedback compensation signal 48. Alternatively, one or more of the plurality of component filters $80_1 \ldots 80_N$ may be a higher-order filter having more than one pole.

The number of individual component filters in the plurality of component filters $80_1 \ldots 80_N$ is also variable depending on the desired complexity and accuracy of the signal compensation circuit 28. Increasing the number of individual component filters in the plurality of component filters $80_1 \ldots 80_N$ may result in the plurality of component filters $80_1 \ldots 80_N$ more closely matching the distortion response of the photodetector 22 and the feedback compensation signal 48 more accurately reproducing the distortion component of the amplified detection signal 36. However, increased complexity and bulk of the optical receiver 20 may be the tradeoff for the superior performance of the signal compensation circuit 28. In some cases, between three to five component filters may be utilized in the plurality of component filters $80_1 \ldots 80_N$; however, a different number of component filters may also be utilized in alternative embodiments of the signal compensation circuit 28. Also, the number of individual component filters in the plurality of component filters $80_1 \ldots 80_N$ may vary depending on the degree of distortion compensation provided by other components of the optical receiver 20. For example, the number of component filters included in the plurality of component filters $80_1 \ldots 80_N$ may be reduced if the photodetector 22 is an SML detector, as SML detector configurations themselves provide some suppression of diffusion current. The number of component filters included in the plurality of component filters $80_1 \ldots 80_N$ may also be reduced for embodiments of the optical receiver 20 where the ac coupling circuit 26 is included and used to suppress the low-frequency diffusion current generated by the photodetector 22.

Referring back to FIG. 2A, curve 52 illustrating a typical response of the photodetector 22 to a short pulse of light may be broken into different intervals characterized by generally different time constants. The plurality of component filters $80_1 \ldots 80_N$ included in the feedback compensation loop 45 of the decision feedback equalizer 39 may be configured so that individual component filters are matched to different portions or characteristics of the curve 52. A first component filter (e.g., $80_1$) may be matched to the fast tail component of curve 52 occurring during interval 56 by extracting the dc gain and time constant characterizing that portion of the curve 52, and designing a suitable low-pass filter based on these parameters, although it is not necessary for the first component filter $80_1$ to have only a single pole. As will be explained in more detail below, the dc gain and time constant characterizing the curve 52 during interval 56 may be extracted by offline testing of the optical receiver 20 using a very low data rate test signal, so that the curve 52 may be captured in its entirety without inter-pulse distortion and subjected to frequency analysis. Bandwidth limitations of the amplifier 24 may also be taken into consideration when the curve 52 during interval 56 is being characterized. The additional component filters $80_2 \ldots 80_N$ in the plurality of component filters $80_1 \ldots 80_N$ may then be designed using the same general approach to match the transition point at $t_2$ and the slow tail component of the curve 52 that occurs during interval 58. Amplifier bandwidth limitations, which only dominate at the fast parts of curve 52, may be neglected here. As the output of each individual component filter in the plurality of component filters $80_1 \ldots 80_N$ is summed together in the summer 82 (or alternatively in the summer 40), the distortion response of the photodetector 22 may be synthesized piece by piece or component by component through design of each component filter individually to match a different portion of the overall response of the photodetector 22 as represented by curve 52.

Typically, the dc gain of the first component filter $80_1$ may be larger than the dc gains of the additional component filters $80_2 \ldots 80_N$, if any. The time constant of the first component filter $80_1$ may also typically be smaller than the time constants of the additional component filters $80_2 \ldots 80_N$, if any. As seen in FIG. 2A, the curve 52 drops to about 20% of its normalized height between $t_1$ and $t_2$, which is a relatively brief interval of time as compared to the length of the long tail appearing after $t_2$. The rate of decay of curve 52 during interval 56 therefore is relatively fast by comparison. Intuitively, a fast pole to synthesize the part of curve 52 occurring in the interval 56 will have little contribution during interval 58, despite a large dc gain, because the fast pole would be essentially zero-valued throughout the whole of the interval 58 due to its fast decay. Moreover, one or more additional slower poles to synthesize the part of curve 52 during interval 58 may have little contribution during interval 56, despite having a slow decay, by keeping the dc gain of these one or more additional poles relatively small. Optionally, one or more component filters in the plurality of component filters $80_1 \ldots 80_N$ may also be designed to have intermediate poles located between the small time constant characterizing the interval 56 and the large time constant characterizing the interval 58, so as to provide better modeling of the curve 52 during the transitional period between the intervals 56 and 58. To a reasonable degree of error, therefore, the individual component filters in the plurality of component filters $80_1 \ldots 80_N$ may be designed independently of each other. However, as will be explained in more detail below, feedback control may also be incorporated into the signal compensation circuit 28 to adjust the characteristics (i.e., dc gains and time constants) of the plurality of component filters $80_1 \ldots 80_N$ for better overall performance of the signal compensation circuit 28, taking different operating characteristics of the optical receiver 20 into account, such as temperature, component aging, and data rate.

The plurality of component filters $80_1 \ldots 80_N$ is generally not restricted to including only first-order filters and may comprise one or more higher-order component filters in addition to, or in place of, the single-pole filters illustrated explicitly in FIG. 5. For example, the first component filter $80_1$ designed to match the fast tail component of curve 52 may be a higher-order filter, while each of the one or more additional component filters $80_2 \ldots 80_N$ designed to match the slow tail component of curve 52 may be first-order filters. However, other configurations are possible as well in alternative embodiments. Moreover, as should be appreciated, a higher-order filter may in some cases be implemented equivalently as one or more first-order filters depending on the number of poles in the higher-order filter. As will be explained in more detail below, it may be convenient to implement the plurality of component filters $80_1 \ldots 80_N$ using only, or mostly, single-pole filters to provide simpler control over the dc gains and time constants of the individual filters included within the plurality of component filters $80_1 \ldots 80_N$.

Figure 6A:
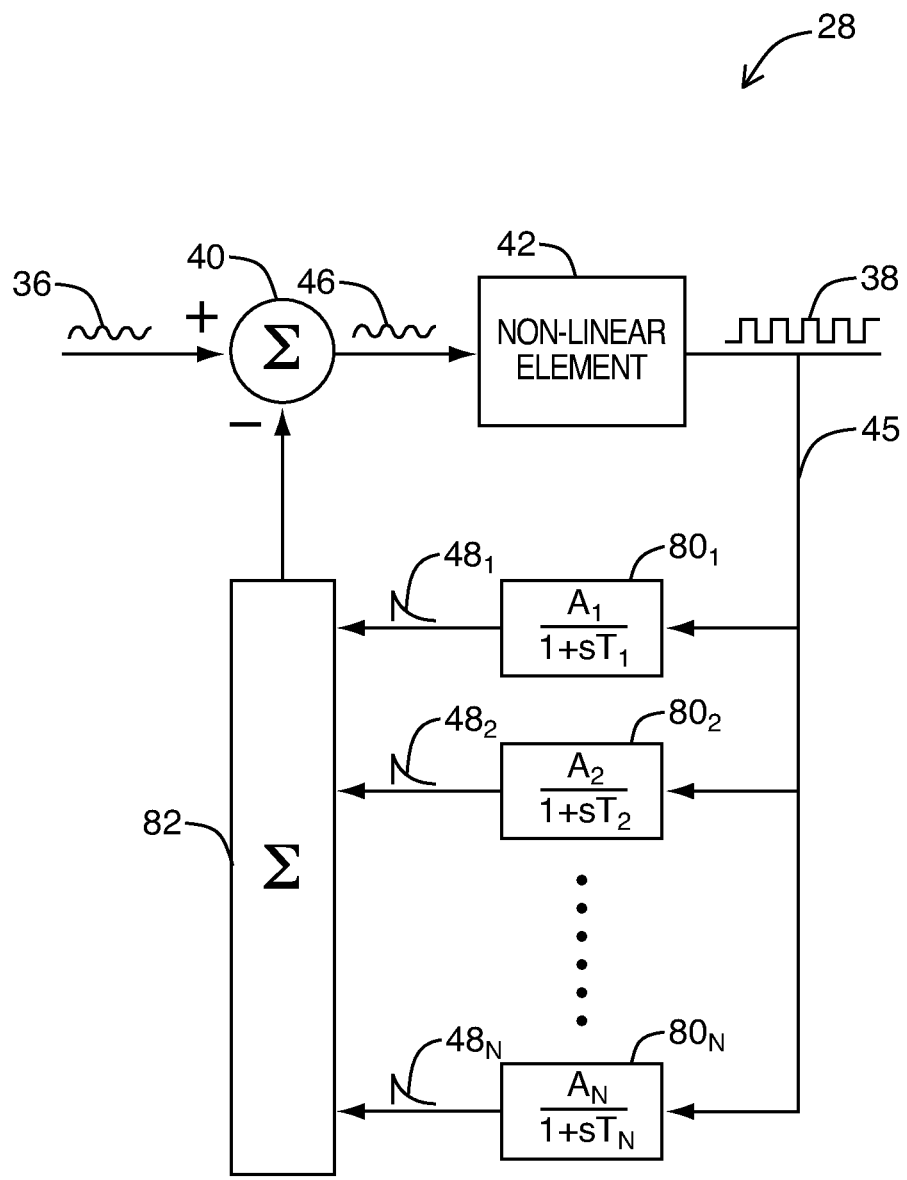
FIG. 6A is a schematic diagram of the signal compensation circuit illustrated in FIG. 5 in which each feedback filter is a continuous-time filter.
Figure 6B:
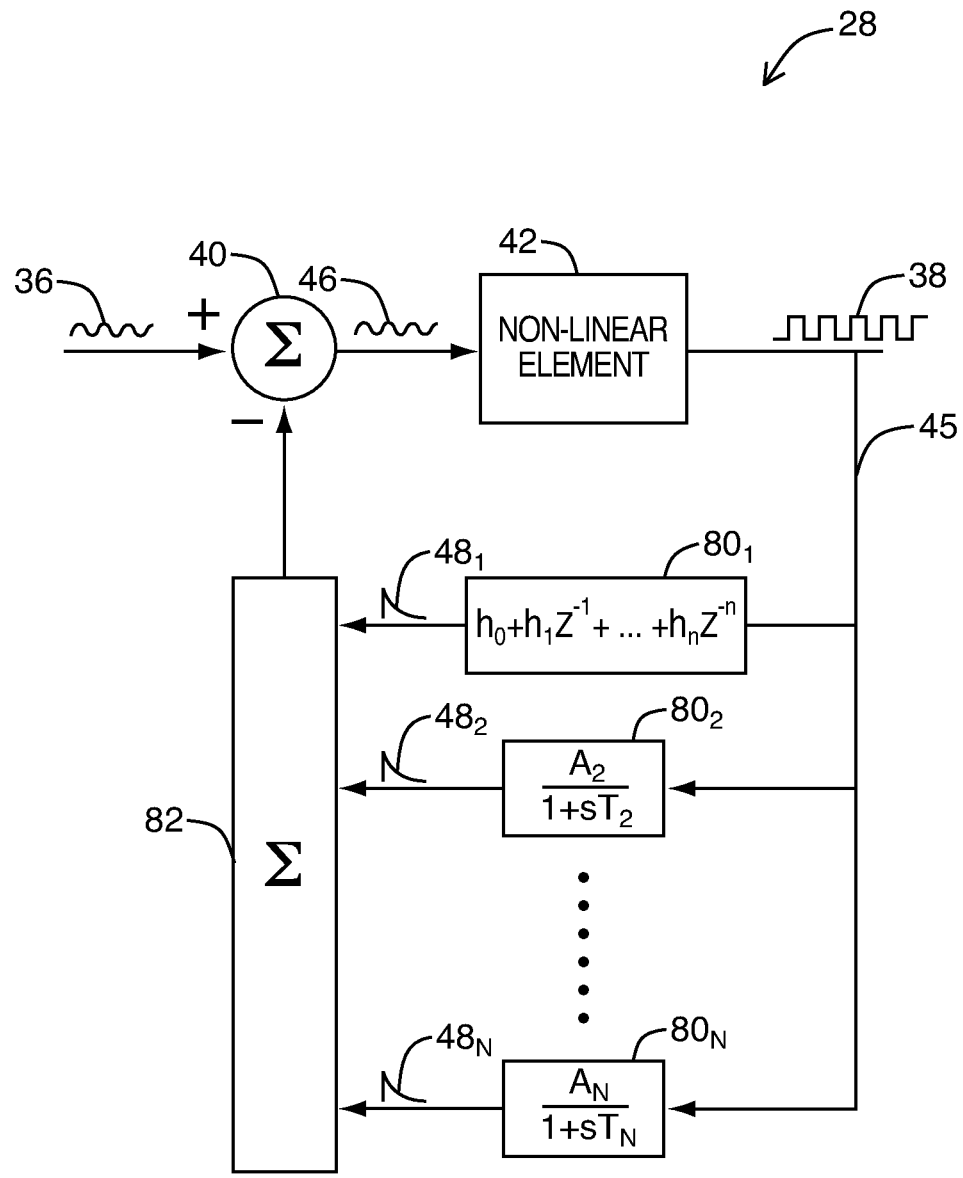
FIG. 6B is a schematic diagram of the signal compensation circuit illustrated in FIG. 5 in which at least one of the plurality of feedback filters is a digital filter and at least one of the plurality of feedback filters is a continuous-time filter.

Referring now to FIGS. 6A and 6B, the signal compensation circuit 28 is illustrated according to embodiments in which different arrangements and types of filters are used to implement the plurality of component filters $80_1 \ldots 80_N$. In FIG. 6A, each component filter in the plurality of component filters $80_1 \ldots 80_N$ is illustrated as a single-pole, continuous time filter having a low-pass characteristic. In FIG. 6B, the first component filter $80_1$ is illustrated as a higher-order, finite impulse response digital filter, while the additional component filters $80_2 \ldots 80_N$ are illustrated as single-pole continuous-time filters. Due to the slow diffusive current generated by the photodetector 22, which results in the characteristic long tail evidenced in curve 52 of FIG. 2, implementing each individual component filter in the plurality of component filters $80_1 \ldots 80_N$ digitally (as either a finite impulse response or infinite impulse response filter) could result in unduly complex filter design. In other words, the extreme length of the tail component of curve 52 could require design of very slow and very bulky digital filters because a number of very high-order filters are required or, alternatively, because a very large number of lower-order filters are required. It may therefore be convenient instead to implement the plurality of component filters $80_1 \ldots 80_N$ using continuous-time configurations as shown in FIG. 6A, for example, based on controllable resistor-capacitor (RC) networks fabricated on a semiconductor substrate.

Alternatively, as illustrated in FIG. 6B, the first component filter $80_1$ may be implemented digitally, while the additional component filters $80_2 \ldots 80_N$ may be implemented using continuous-time configurations. Because the first component filter $80_1$ may have a relatively fast pole matched to the fast tail component of curve 52, as compared to the relatively slow poles of the additional component filters $80_2 \ldots 80_N$, which may be matched to the slow tail component of curve 52, filter bulk and complexity may not be as significant a consideration for the first component filter $80_1$. Thus, it may be convenient to implement the first component filter $80_1$ but not the additional component filters $80_2 \ldots 80_N$ digitally in order to exploit some of the performance advantages of digital filters. For example, digital filters tend to be less susceptible to component tolerances and non-linearities, as well as operating or environmental conditions like temperature. Because digital filters store filter coefficients in memory, as opposed to realizing the coefficients using filter components, digital filters tend also to be more stable than continuous-time filters. If the filter order can be kept moderately low, therefore, digital filters may be preferred to analog filters for implementing at least the first component filter $80_1$ in the plurality of component filters $80_1 \ldots 80_N$. However, as described herein, the relative disadvantages associated with analog filters may be preferable to the bulk and slow computational performance associated with very high-order digital filters. It should also be appreciated that the permutations shown explicitly in FIGS. 6A and 6B are exemplary only, and that other permutations, both in terms of filter type and order, for implementing the plurality of component filters $80_1 \ldots 80_N$ may be apparent as well.

Figure 7:
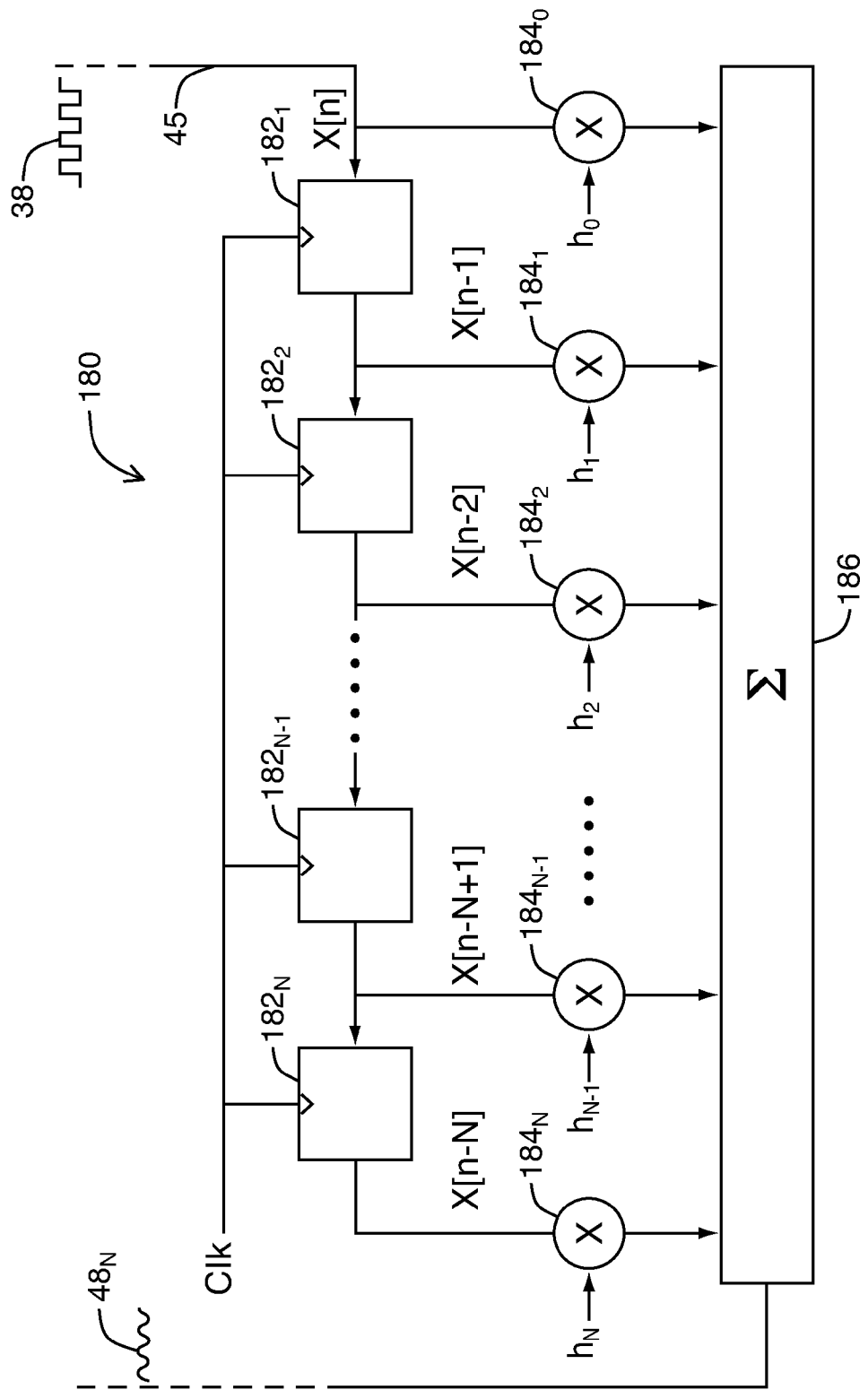
FIG. 7 is a schematic diagram of a digital finite impulse response filter that can be used to implement at least one of the plurality of feedback filters illustrated in FIG. 5.

Referring now to FIG. 7, there is illustrated an example implementation of a digital FIR filter 180 that may be used in some embodiments to implement at least one of the plurality of component filters $80_1 \ldots 80_N$ included in the feedback compensation loop 45 of the decision feedback equalizer 39. The digital FIR filter 180 comprises a plurality of clocked flip-flops $182_1 \ldots 182_N$, a plurality of mixers $184_0 \ldots 184_N$, and a summer 186. The plurality of flip-flops $182_1 \ldots 182_N$ may be arranged, as illustrated, in a cascade formation and driven by a common clock signal clk. By receiving the reconstructed data signal 38 into a first flip-flop $182_1$, the plurality of flip-flops $182_1 \ldots 182_N$ may function as a progressive delay stage. Thus, relative to an arbitrary reference time, the output of the first flip-flop $182_1$ may effectively represent the reconstructed data signal 38 delayed by one clock cycle, the output of the second flip-flop $182_2$ may effectively represent the reconstructed data signal 38 delayed by two clock cycles, and so on, so that the output of the $N^{th}$ flip-flop may effectively represent the reconstructed data signal 38 delayed by N clock cycles. As the reconstructed data signal 38 is effectively a continuous time representation of a digital signal, the outputs of the plurality of flip-flops $182_1 \ldots 182_N$ may be essentially equal to the reconstructed data signal 38 but delayed by a corresponding number of clock cycles. The number of individual flip-flops in the plurality of flip-flops $182_1 \ldots 182_N$ may also be related to the order of the digital FIR filter 180. As described herein, for accurate matching to the slow tail component of curve 52, the order of the digital FIR filter 180 may be anywhere from one to somewhere in the hundreds.

The plurality of mixers $184_0 \ldots 184_N$ may be coupled respectively to the outputs of the plurality of flip-flops $182_1 \ldots 182_N$, with the exception that mixer $184_0$ may be coupled to the input of the first flip-flop $182_1$ in order to receive the reconstructed data signal 38 without delay. Coefficients $h_0 \ldots h_N$ may be supplied respectively to the mixers $184_0 \ldots 184_N$ to generate weighted outputs of the plurality of flip-flops $182_1 \ldots 182_N$, which are then summed together in summer 186 and outputted as some component feedback compensation signal $48_N$ in the plurality of component feedback compensation signals $48_1 \ldots 48_N$. (The configuration shown in FIG. 7 may be used in different embodiments for any or all of the individual component filters in the plurality of component filters $80_1 \ldots 80_N$.) The coefficients $h_0 \ldots h_N$ may be computed based on the desired performance characteristics (e.g., order, gain, frequency response) for the digital FIR filter 180. Optionally, the component feedback compensation signal $48_N$ may also be smoothed before or after being outputted.

Figure 8:
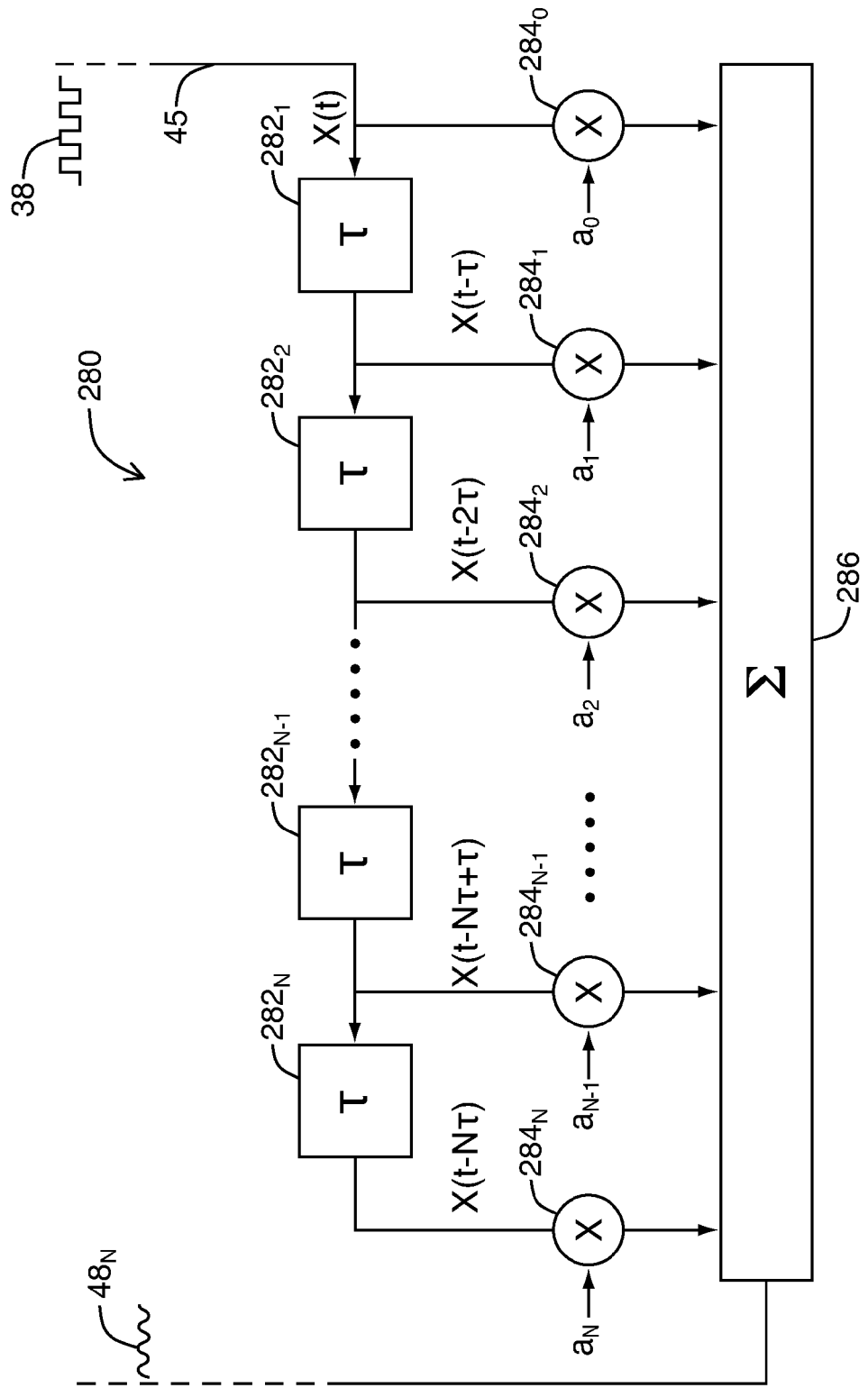
FIG. 8 is a schematic diagram of a continuous-time finite impulse response filter that can be used to implement at least one of the plurality of feedback filters illustrated in FIG. 5.

Referring now to FIG. 8, there is illustrated an example implementation of a continuous-time FIR filter 280 that may be used in some embodiments to implement at least one of the plurality of component filters $80_1 \ldots 80_N$ included in the feedback compensation loop 45. The continuous-time FIR filter 280 is similar in configuration to the digital FIR filter 180 illustrated in FIG. 7 but implemented in continuous-time. Accordingly, the continuous-time FIR filter 280 comprises a plurality of delay elements $282_1 \ldots 282_N$, a plurality of mixers $284_0 \ldots 284_N$, and a summer 286. The plurality of delay elements $282_1 \ldots 282_N$ may again be cascaded to progressively delay the reconstructed data signal 38, received into a first delay element $282_1$, by a time interval $\tau$. For example, the plurality of delay elements $282_1 \ldots 282_N$ may be micro transmission lines with an associated end-to-end delay equal to the interval $\tau$, although other types and configurations of delay elements used to implement the plurality of delay elements $282_1 \ldots 282_N$ may be apparent. As in FIG. 7, the plurality of mixers $284_0 \ldots 284_N$ may be coupled respectively to the plurality of delay elements $282_1 \ldots 282_N$ to scale the delayed versions of the reconstructed data signal 38 by appropriately computed coefficients $a_0 \ldots a_N$ for summation in summer 286. Optional smoothing may also be applied to the component feedback compensation signal $48_N$ at the output of the summer 286.

Figure 9:
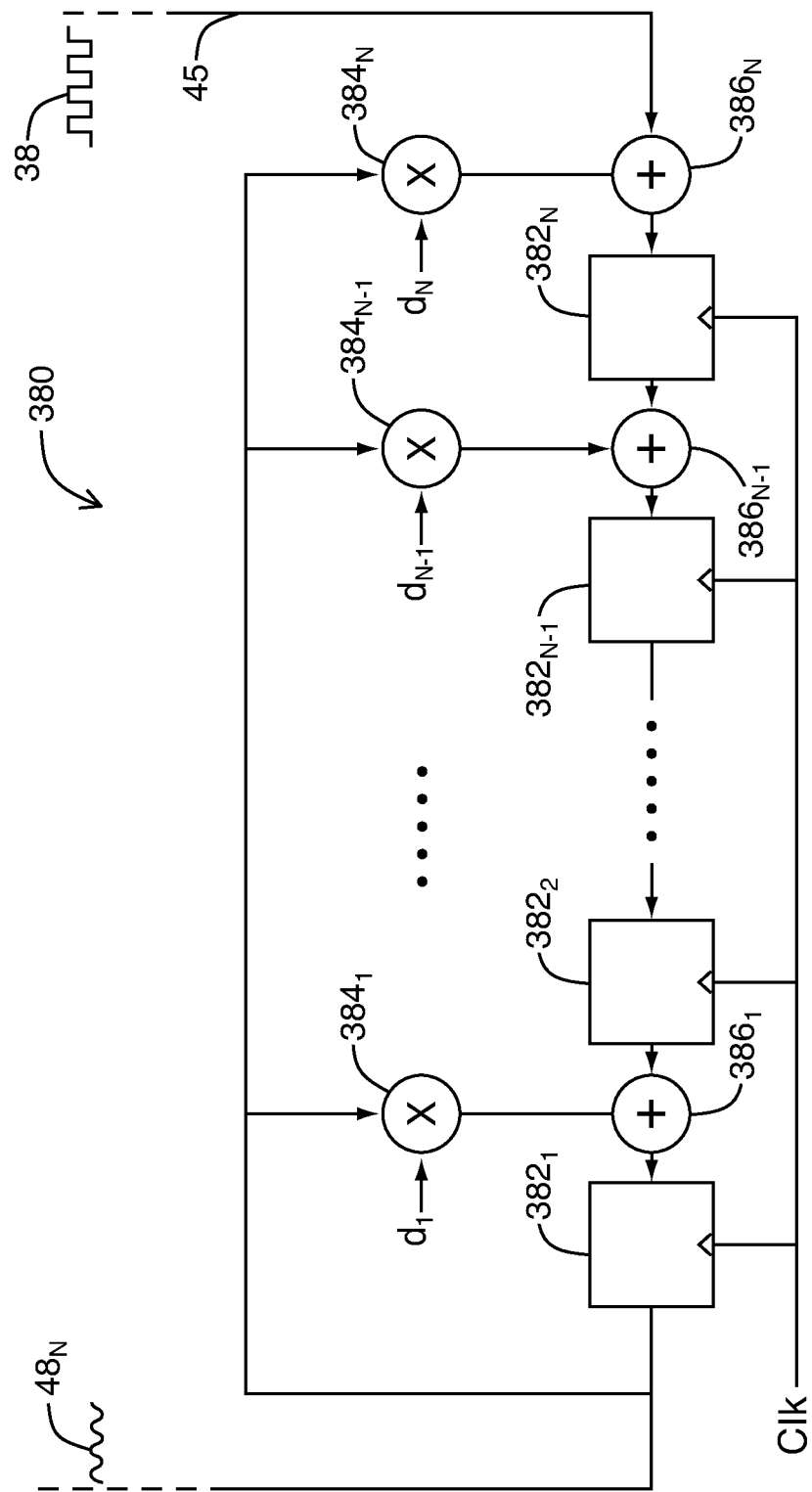
FIG. 9 is a schematic diagram of a digital infinite impulse response filter that can be used to implement at least one of the plurality of feedback filters illustrated in FIG. 5.

Referring now to FIG. 9, there is illustrated an example implementation of a digital infinite impulse response (IIR) filter 380 that may be used in some embodiments to implement at least one of the plurality of component filters $80_1 \ldots 80_N$ included in the feedback compensation loop 45. The digital IIR filter 380 differs in configuration from the digital FIR filter 180 shown in FIG. 7 and the continuous-time FIR filter 280 shown in FIG. 8 in so far as the filter output (i.e., the component feedback compensation signal $48_N$) is fed back to give the digital IIR filter 380 an infinitely long in time impulse response. Accordingly, the digital IIR filter 380 comprises a plurality of flip-flops $382_1 \ldots 382_N$, a plurality of mixers $384_0 \ldots 384_N$, and a plurality of summers $386_1 \ldots 386_N$ connected as shown in FIG. 9. The plurality of summers $386_1 \ldots 386_N$ are interleaved with the plurality of flip-flops $382_1 \ldots 382_N$ in cascade formation and coupled to respective outputs of the plurality of mixers $384_1 \ldots 384_N$. A common clock signal clk is used to trigger the plurality of flip-flops $382_1 \ldots 382_N$, and filter coefficients $d_1 \ldots d_N$ are provided to the plurality of mixers $384_1 \ldots 384_N$. The reconstructed data signal 38 is provided to a final pair consisting of a final flip-flop $382_N$ and a final summer $386_N$. In the arrangement shown, the present output of the digital IIR filter 380 may equal a weighted summation of past output values of the digital IIR filter 380 and the reconstructed data signal 38. As before, the filter coefficients $d_1 \ldots d_N$ may be designed to provide the digital IIR filter 380 with desired performance characteristics. For example, the filter coefficients $d_1 \ldots d_N$ may be designed so that the digital IIR filter 380 is matched to one or more operating characteristics of the photodetector 22 and so that the overall response of the plurality of component filters $80_1 \ldots 80_N$ accurately estimates the distortion component of the amplified detection signal 36 introduced by the operating characteristics of the photodetector 22.

Figure 10:
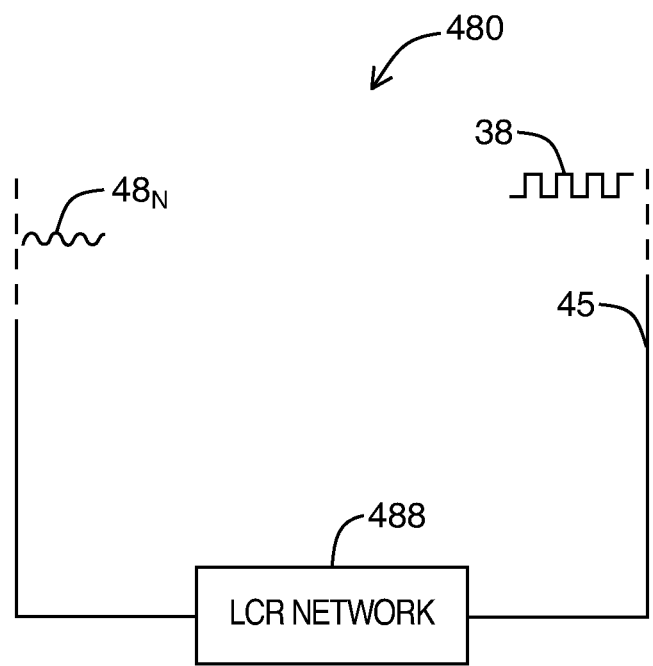
FIG. 10 is a schematic diagram of a continuous-time infinite impulse response filter that can be used to implement at least one of the plurality of feedback filters illustrated in FIG. 5.

Referring now to FIG. 10, there is illustrated an example implementation of a continuous-time infinite impulse response (IIR) filter 480 that may be used in some embodiments to implement at least one of the plurality of component filters $80_1 \ldots 80_N$ included in the feedback compensation loop 45. The continuous time IIR filter 480 may be implemented, for example, using an LCR network 488. Through appropriate component selection and configuration of the LCR network 488, continuous-time IIR filter 480 may implement some arbitrary response of the form, $$H(s) = \frac{b_M s^M + b_{M-1} s^{M-1} + \ldots + b_1 s + b_0}{c_N s^N + c_{N-1} s^{N-1} + \ldots + c_1 s + c_0}. \quad (2)$$

As before, filter coefficients $b_0 \ldots b_M$ and $c_0 \ldots c_M$, as well as various lumped circuit elements (resistors, capacitors, inductors, etc.) used to implement the LCR network 488, may be designed to provide the continuous-time IIR filter 480 with desired performance characteristics, for example, to match one or more operating characteristics of the photodetector 22 or a response of the photodetector 22 to a short pulse of light. In some embodiments, an RC network may be used as an alternative to the LCR network 488.

An IIR filter of either type illustrated in FIGS. 9 and 10 may be effective for compensating the slow tail part of the distortion component of the amplified detection signal 36. As mentioned previously, some FIR filters may, for the same purpose, have undue complexity and bulk issues due to the extreme length of the slow tail part of the distortion component (reflecting slow diffusive current in the photodetector 22). However, any of the filter implementations illustrated in FIGS. 7-10 may in some embodiments be appropriate for compensating the fast part of the distortion component, which is affected by drift current in the photodetector 22 and the frequency characteristics of the amplifier 24 predominately. Because the fast tail component of the distortion component is characterized by a small time constant in comparison to the slow tail component, filter complexity is less of an issue. Either IIR or FIR, as well as digital or continuous-time, types of filters may be appropriate.

Figure 11:
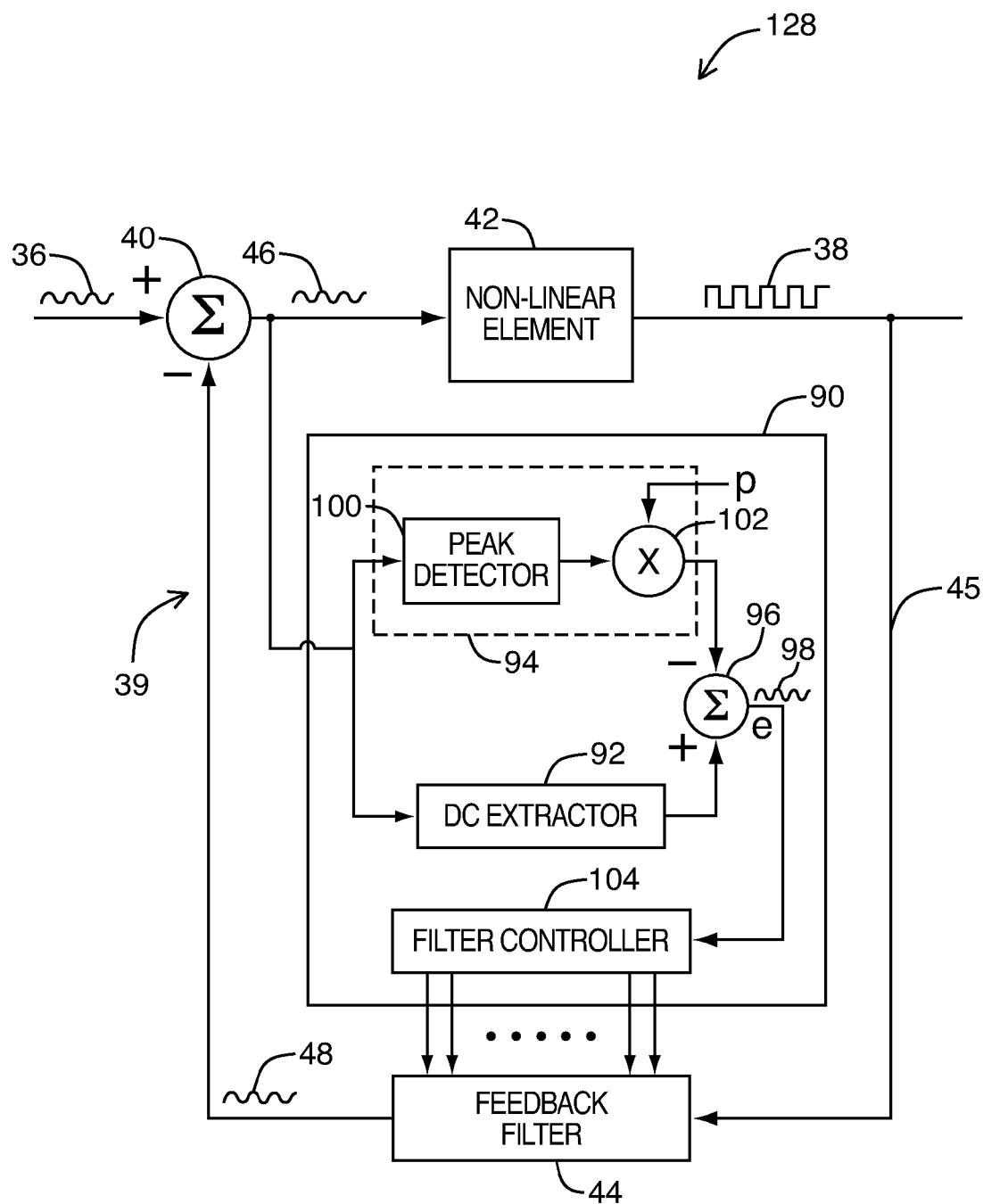
FIG. 11 is a schematic diagram of the signal compensation circuit illustrated in FIG. 1 in which a control module for configuring the signal compensation circuit to match the photodetector is included.

Referring now to FIG. 11, there is illustrated an example implementation of a signal compensation circuit 128 that utilizes a control module 90 to configure the signal compensation circuit 128 for matching the response of the photodetector 22. The signal compensation circuit 128 is like the signal compensation circuit 28 illustrated in FIG. 1, for example, but further includes the control module 90. Elements common to the signal compensation circuit 28 and the signal compensation circuit 128 will not be discussed in detail. In embodiments of the optical receiver 20 where the ac coupling circuit 26 is omitted, control module 90 may be used to adjust one or more parameters of the signal compensation circuit 128 so that the decision feedback equalizer 39 is matched to, and thereby effectively compensates, for the one or more operating characteristics of the photodetector 22 that cause the detection signal 34 and the amplified detection signal 36 to become distorted. For example, the control module 90 may configure the feedback filter 44 to reproduce the distortion component of the amplified detection signal 36 due to slow diffusive current generated in the photodetector 22. Configuration of the decision feedback equalizer 39 may also account for the operating temperature and/or supply voltage of the optical receiver 20, the data rate or received signal amplitude of the optical data signal 32, operating, physical characteristics (e.g., geometry, semiconductor dopant levels) of the photodetector 22, as well as component aging. In some embodiments, the control module 90 may also be used to configure the non-linear element 42. For example, if the hysteretic comparator 72 is included in the non-linear element 42, the control module 90 may adjust one or both of the first (upward going) and second (downward going) threshold levels of the hysteretic comparator 72. However, in embodiments where the ac coupling circuit 26 is included in the optical receiver 20, then an alternative to control module 90 may be utilized instead to configure the decision feedback equalizer 39, or no control module 90 at all in some cases.

Control module 90 may be coupled to the output of the summer 40 to receive the compensated detection signal 46 as a control input, and may further be coupled to the feedback filter 44 to provide as outputs one or more control values to the feedback filter 44. As explained in more detail below, a bit frequency signal p may also be provided to the control module 90. When the signal compensation circuit 128 is closely matched to the response of the photodetector 22, the feedback compensation signal 48 should accurately reproduce the component of the amplified detection signal 36 representing distortion caused by one or more operating characteristics of the photodetector 22. By subtracting the feedback compensation signal 48 from the amplified detection signal 36, the compensated detection signal 46 should also then have a substantially square waveform pattern. If the distortion component of the amplified detection signal 36 has been fully compensated (resulting ideally in a perfect square waveform pattern), the dc component of the compensated detection signal 46 (i.e., its average value) will generally depend on the amplitude of the ideal square waveform pattern and the bit distribution of the optical data signal 32. A balanced bit distribution, for example, would result in the ideal square waveform pattern having a dc component equal to one-half the amplitude of the ideal square waveform pattern.

On the other hand, if the distortion component of the amplified detection signal 36 has not been fully compensated, the compensated detection signal 46 will not attain an ideal square waveform pattern. The dc component of the compensated detection signal 46 may not then depend just on the amplitude of the ideal square waveform pattern and the bit distribution p of the optical data signal 32. Uncompensated distortion remaining in the compensated detection signal 46 may skew the dc component up or down from its expected (or reference) level. Comparison of a measured dc component of the compensated detection signal 46 with the reference dc component level may therefore indicate whether or not the amount of compensation provided by the signal compensation circuit 128 is adequate. Where the amount of compensation is not adequate, adjustment to the decision feedback equalizer 39 may then be made offline (e.g., manually) or online (e.g., using feedback control) to affect the amount of compensation provided.

Accordingly, control module 90 may comprise dc extractor 92, dc reference generator 94, and summer 96 arranged as shown in FIG. 11 to generate a compensation error signal 98, which is representative of uncompensated distortion remaining in the compensated detection signal 46. Each of the dc extractor 92 and dc reference generator 94 may be coupled to the output of the summer 40 in order to receive the compensated detection signal 46. The dc extractor 92 is configured to measure the dc component of the compensated detection signal 46. For example, the dc extractor 92 may comprise a low-pass filter, an integrator, or some other component suitable for measurement of dc components as will be appreciated. The measured dc component generated by the dc extractor 92 may then be provided to the summer 96 for comparison with a corresponding reference dc component generated by the dc reference generator 94.

The dc reference generator 94 may comprise a peak detector 100 and a scaler 102 coupled to the output of the peak detector 100. The peak detector 100 may be configured to generate a signal representing an envelope of the compensated detection signal 46. For example, the peak detector 100 may comprise a fast track and hold circuit or some other component suitable for tracking envelopes as will be appreciated. Assuming essentially complete compensation of the distortion component of the amplified detection signal 36, the compensated detection signal 46 will be substantially a pulse train and the envelope signal generated by the peak detector 100 should be nearly constant at a level equal to the height or amplitude of the individual pulses in the pulse train. By multiplying the envelope signal generated by the peak detector 100 with the bit distribution p, the scalar 102 generates a reference dc component for the ideal case where the compensated detection signal 46 is fully compensated. For example, if the distribution of high voltages (digital "1") in the pulse train compared to low voltages (digital "0") is approximately 0.5, then the dc component of the compensated detection signal 46 will be approximately half the height of the envelope of the pulse train. In general, if the distribution of high voltages to low voltages is equal to p ($0 \leq p \leq 1$), then scaling the envelope signal by the bit distribution p may be used to specify the reference dc component corresponding to full compensation of the distortion component.

The summer 96 is coupled to the dc extractor 92 and the dc reference generator 94 to compare the measured and reference dc components of the compensated detection signal 46. The compensation error signal 98 generated by the comparison indicates the effectiveness of the distortion compensation. Optimal compensation will have been achieved when the compensation error signal 98 equals to zero. Accordingly, the measured dc component equaling or approximately equaling the reference dc component indicates that substantially the entire distortion component of the amplified detection signal 36 has been canceled. However, where the compensation error signal 98 is greater than zero, it indicates that some part of the distortion component has not been compensated because the measured dc component of the compensated detection signal 46 is higher than expected. As the slow tail component of curve 52 may predominantly contain low dc voltage, uncompensated distortion introduces additional dc voltage and skews the measured dc component of the compensated detection signal 46 upward above expected reference levels. Likewise where the compensation error signal 98 is less than zero, it indicates that the distortion component has been over compensated. The fact that the measured dc component of the compensated detection signal 46 is lower than expected, it may indicate that some part of the data component of the amplified detection signal 36, in addition to the distortion component, has been canceled by the feedback compensation signal 48. The sign and magnitude of the compensation error signal 98 in this way may represent the type and degree of adjustment to the decision feedback equalizer 39 needed to more closely match the response of the photodetector 22.

The filter controller 104 may be included in the control module 90 and coupled to the output of the summer 96 to receive the compensation error signal 98 as an input. The filter controller 104 may be configured to use the compensation error signal 98 as an error signal for controlling the feedback filter 44 until optimal compensation of the amplified detection signal 36 is achieved. Accordingly, the compensation error signal 98 may be used to adjust one or more parameters of the feedback filter 44 until the response of the feedback filter 44 matches the response of the photodetector 22 (which will be indicated by the compensation error signal 98 being essentially zero valued). For example, if the feedback filter 44 comprises a discrete plurality of filters (e.g., the plurality of component filters $80_1 \ldots 80_N$ illustrated in FIG. 5), a dc gain and/or time constant of one or more of the plurality of component filters $80_1 \ldots 80_N$ may be controlled according to the compensation error signal 98.

The dc gains and/or time constants of the individual component filters in the plurality of component filters $80_1 \ldots 80_N$ may be pre-characterized through offline testing of the optical receiver 20 so as to match the response of the photodetector 22. For example, a very low data rate test signal may be provided to the photodetector 22. If the individual pulses in the test signal are spaced far enough apart in time, then the response of the photodetector 22 to one pulse, such as the resulting long tail component, will not interfere with the waveform generated by receipt of subsequent pulses. The entire response of the photodetector 22, including the response associated with a single pulse, may then be sampled and analyzed for its frequency content, for example, using a Fourier transform or curve-fitting algorithm. Different parts of the photodetector transient response may also be windowed so that the different parts of the overall transient response may be isolated during the analysis for computation of dc gains and/or time constants. Once the response of the photodetector 22 has been characterized in this way, the feedback filter 44 (or equivalently the plurality of component filters $80_1 \ldots 80_N$) may then be designed based on the computed dc gains and/or time constants to match.

However, because the response of the photodetector 22 may exhibit some dependency on different operating or environmental conditions, examples of which are listed above, the pre-characterized values computed for the dc gains and/or time constants of the feedback filter 44 or plurality of component filters $80_1 \ldots 80_N$ may not be acceptable over the entire range of operating or environmental conditions of the optical receiver 20. Accordingly, in some embodiments, the control module 90 may initialize the individual component filters in the plurality of component filters $80_1 \ldots 80_N$ to their pre-characterized filter parameters (i.e., dc gain and/or time constant) and, as required, adjust the filter parameters thereafter during operation of the optical receiver 20 using the compensation error signal 98 in order to maintain a good match between the feedback filter 44 (or the plurality of component filters $80_1 \ldots 80_N$) and the response of the photodetector 22. For this purpose, suitable gain controllers may be implemented in the filter controller 104, in some cases, one such gain controller for each parameter of the feedback filter 44 (or the plurality of component filters $80_1 \ldots 80_N$) being controlled.

If the feedback filter 44 (or if one of the plurality of component filters $80_1 \ldots 80_N$) is implemented using a filter configuration in which filter coefficients are provided explicitly (e.g., using one of the digital FIR filter 180, the continuous-time FIR filter 280 or the digital IIR filter 380), the filter controller 104 may comprise a processor or microcontroller configured to calculate the respective filter coefficients for that type of filter based on the compensation error signal 98. For example, the processor or microcontroller may determine and provide these filter coefficients directly using feedback control of the compensation error signal 98, but alternatively may use the compensation error signal 98 to adjust pre-stored initial filter coefficients.

If the feedback filter 44 (or if one of the plurality of component filters $80_1 \ldots 80_N$) is implemented using the LCR network 488 or an RC-network fabricated on a semiconductor substrate (e.g., using the continuous-time IIR filter 480), the filter controller 104 may further comprise a suitable actuator for controlling the frequency characteristics of the RC-network. For example, the LCR network 488 or RC-network may comprise variable, voltage-controlled resistors and capacitors. The filter controller 104 may then include a switch converter or some other controllable voltage supply for providing control voltages to the variable resistors and capacitors. Alternatively, the LCR network 488 or RC-network may comprise a plurality of different pre-defined resistors and capacitors arranged in a switch network to provide controllability. Depending on the control signals supplied to the switch network, a different resistor-capacitor combination may be selected so as to adjust the parameters of the RC-network. Either way, one or both of dc gain and time constant may again be controlled in order to adjust the amount of distortion compensation provided based on the compensation error signal 98.

Figure 12:
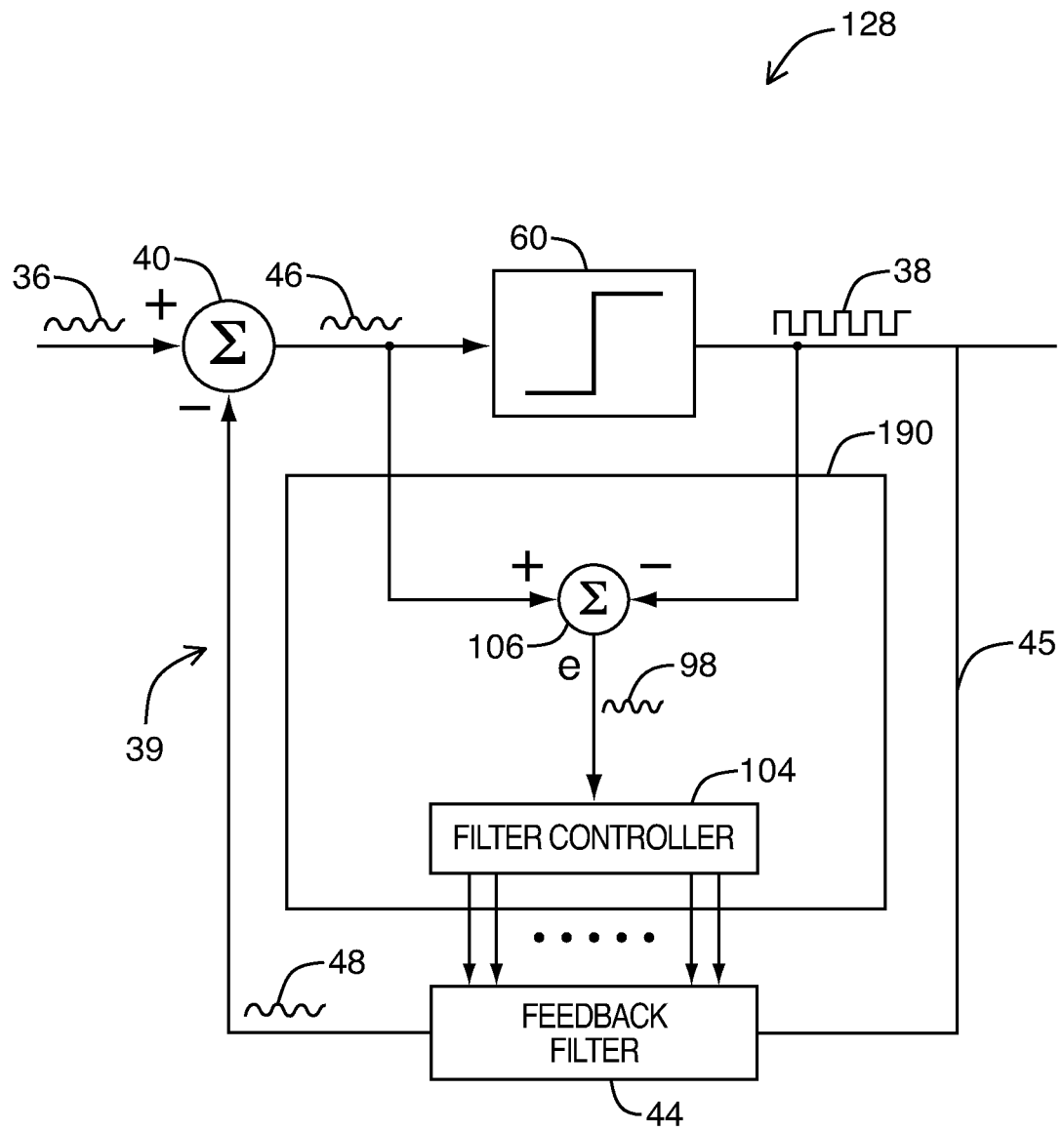
FIG. 12 is a schematic diagram of the signal compensation circuit illustrated in FIG. 1 in which an alternative control module is included.

Referring now to FIG. 12, there is illustrated an example implementation of a control module 190 that may be used in the signal compensation circuit 128 as an alternative to the control module 90 illustrated in FIG. 11. In the control module 190, the compensation error signal 98 is generated instead using a summer 106 coupled to each of the input and output of the signal quantizer 60 to calculate a difference between the reconstructed data signal 38 and the compensated detection signal 46. As discussed above, when the decision feedback equalizer 39 is properly matched to the photodetector 22, and is thereby providing complete or near complete compensation of the distortion component of the amplified detection signal 36, ideally the compensated detection signal 46 should exactly equal the reconstructed data signal 38. The difference between the compensated detection signal 46 and the reconstructed data signal 38 as a result of quantization in the nonlinear element 42, therefore, may also provide a measure of how effectively the distortion component of the amplified detection signal 36 is being cancelled by the feedback compensation error signal 48. Other than how the compensation error signal 98 is generated, the control module 190 may function similar to the control module 90 as described herein and illustrated in FIG. 11.

Figure 13:
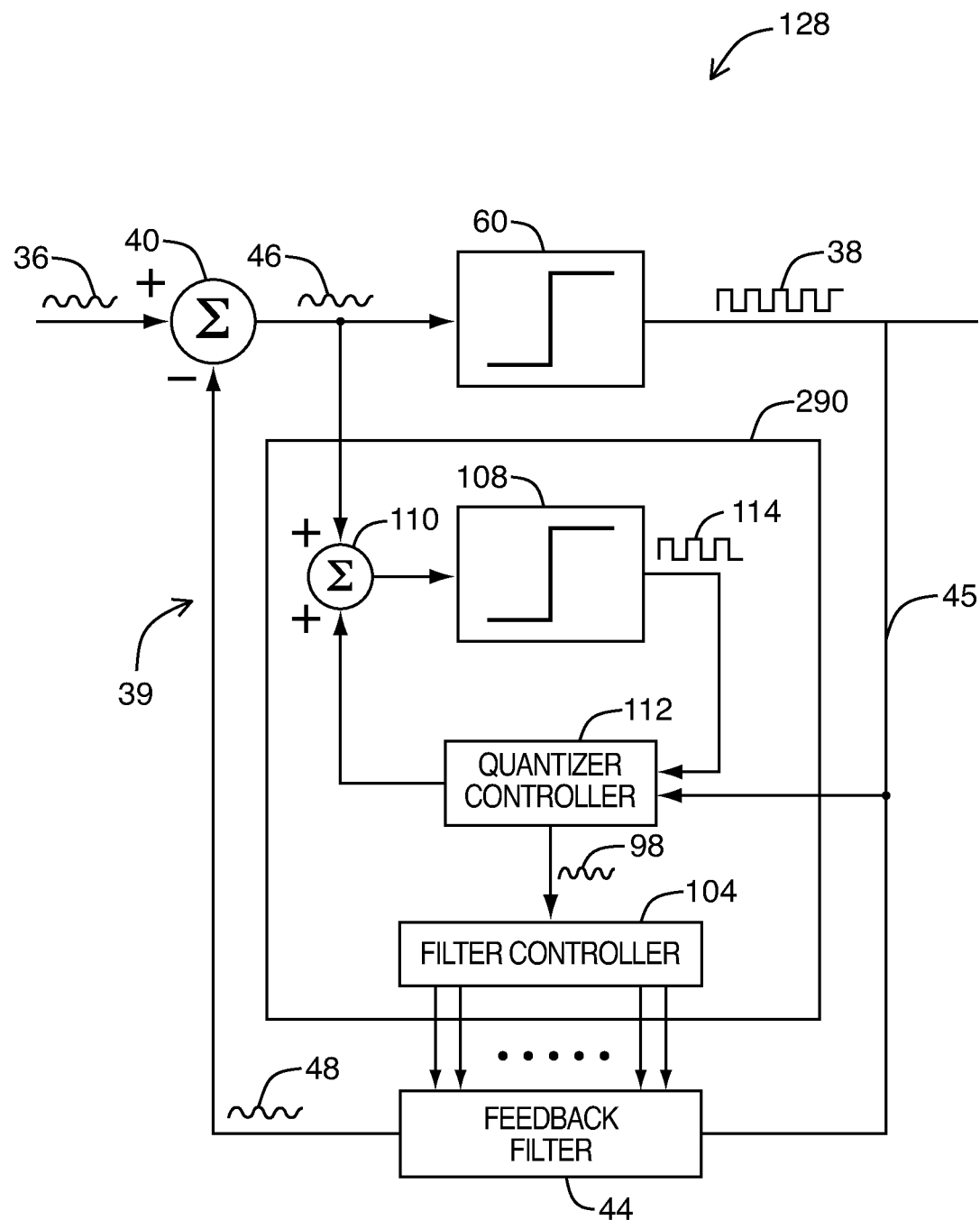
FIG. 13 is a schematic diagram of the signal compensation circuit illustrated in FIG. 1 in which an alternative control module is included.

Referring now to FIG. 13, there is illustrated an example implementation of a control module 290 that may be used in the signal compensation circuit 128 as a further alternative to the control module 90 and the control module 190 illustrated in FIGS. 11 and 12, respectively. In the control module 290, the compensation error signal 98 may be generated using feedback from an auxiliary quantizer 108, which is identical to the signal quantizer 60, but which is configured to operate with an effectively adjustable quantization threshold. The compensated detection signal 46 is provided to the auxiliary quantizer 108 after addition of a small offset level in summer 110. Shifting the compensated detection signal 46 up or down by this small amount level can simulate a corresponding shift in the quantization threshold of the auxiliary quantizer 108. The quantizer controller 112 may be configured to generate the offset level provided to the summer 110, as well as the compensation error signal 98 provided to the filter controller 104, based jointly on the output signal 114 from the auxiliary quantizer 108 and the reconstructed data signal 38 generated by the signal quantizer 60. The filter controller 104 may function as described herein above with reference to FIGS. 11 and 12.

The output signal 114 generated by the auxiliary quantizer 108 may have a pulse train waveform similar, but not necessarily identical, to the reconstructed data signal 38 generated by the signal quantizer 60. The different waveforms of the output signal 114 and the reconstructed data signal 38 may be due to the effectively variable quantization threshold of the auxiliary quantizer 108. When the distortion component of the amplified detection signal 36 has been fully compensated (resulting ideally in a perfect square waveform), the threshold of the auxiliary quantizer 108 can be varied over a wide range but still produce the output signal 114 to have a waveform substantially the same as the reconstructed data signal 38. If the compensated detection signal 46 has nearly an ideal square waveform, the very fast transitions between the high and low voltage levels in the waveform will cross different quantization thresholds at approximately the same time due to the relatively fast rate of change of the waveform during level transitions. However, that would not necessarily be the case if the compensated detection signal 46 has a sizable uncompensated distortion component resulting in a comparatively slow rate of change of the waveform during level transitions. By observing the output signal 114 that is generated in response to the offset level in the auxiliary quantizer 108 being controllably swept, the quantizer controller 112 may determine the range of offset levels over which the auxiliary quantizer 108 maintains the output signal 114 substantially equal to the reconstructed data signal 38. Based on the range of offset levels for which that condition holds, the quantizer controller 112 may generate and provide the compensation error signal 98 to the filter controller 104 to reflect the effectiveness of the distortion cancellation. When the control module 290 has settled and the distortion component of the amplified detection signal 36 is fully compensated, the quantizer controller 112 may reduce the compensation error signal 98 to near zero to hold the feedback filter 44 in its present configuration.

Figure 14:
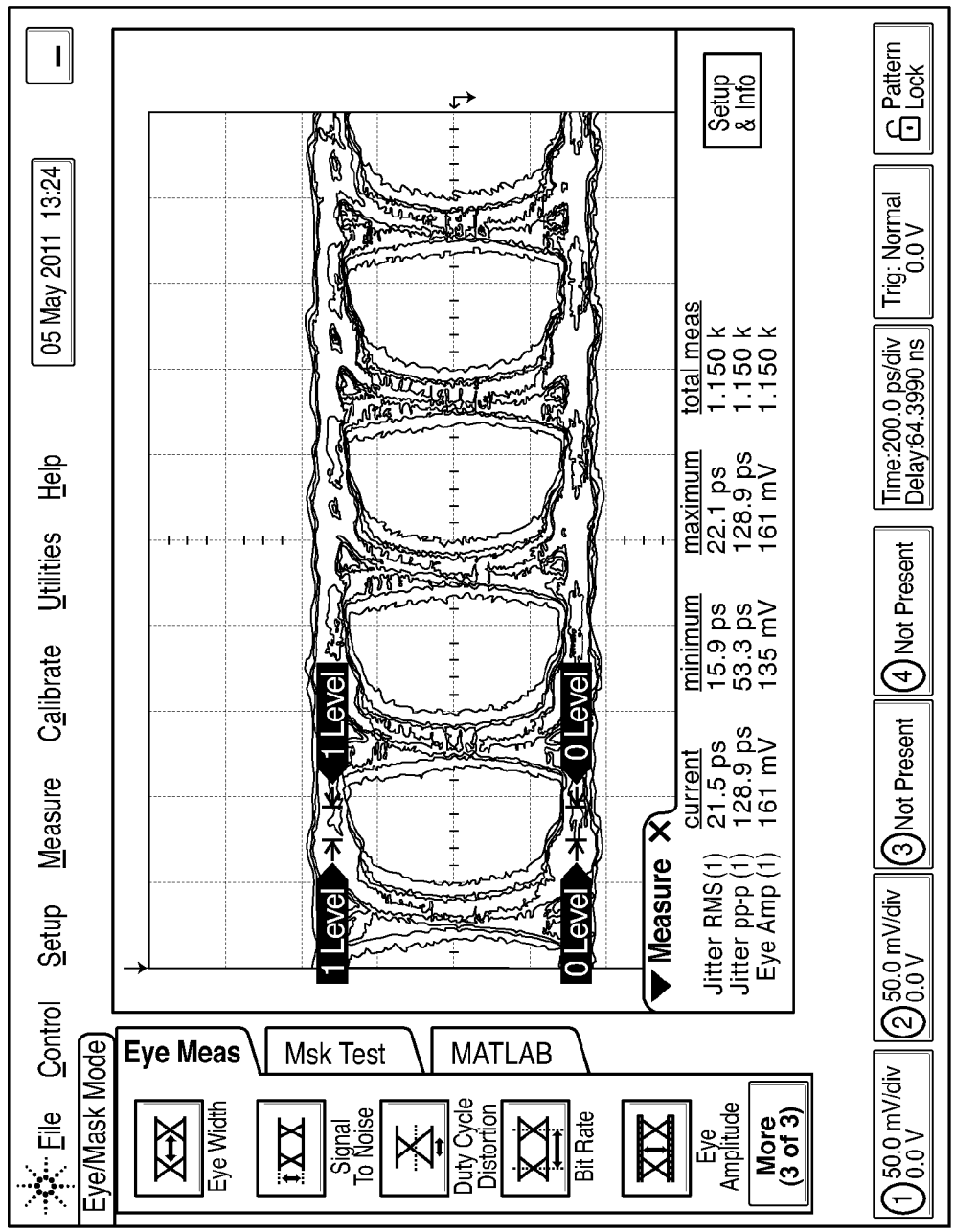
FIG. 14 is a graph showing experimental results obtained during testing of an embodiments of the optical receiver shown in FIG. 1.

Referring now to FIG. 14, there is illustrated a graph showing some experimental results obtained during testing of an embodiment of the optical receiver 20 described herein. In the experimental results, a CMOS embodiment was used with the photodetector integrated onto the same die alongside all circuitry within the optical receiver. The photodetector was implemented using a reverse biased diode in a common-anode configuration and exposed to an input optical signal from above. A transimpedance amplifier was used with a negative Miller capacitor incorporated into the core of the amplifier to extend its bandwidth. An RC high-pass filter was used to suppress the distortion component of the detection signal generated by the integrated CMOS photodetector, and a hysteretic comparator following the RC high-pass filter was used to restore the lost low frequency content of the data component. No feedback filter or summer was used in the optical receiver under test, similar to the embodiment of the optical receiver 20 illustrated in FIG. 3C. The input optical signal used during the test was transmitted at a wavelength of 850 nm and at a data rate of 2.5 Gbps.

The plot in FIG. 14 shows an overlay of hundreds of random data sequences (e.g., corresponding to the reconstructed data signal 38) generated and outputted by the optical receiver 20 in response to a multi-Gbps input data pattern. The clearly discernible high and low logic levels in the overlay indicate that the optical receiver 20 under test was able to compensate for distortion within the integrated photodetector and thereby successfully reconstruct the input data pattern. In particular, but without limitation, the experimental results demonstrate how the optical receiver 20 under test was able to cancel the slow tail component of the photodetector response caused by slow diffusive carrier generation within the photodetector without adverse impact on the transmitted data pattern. While experimental results generated in the context of one particular implementation of the optical receiver 20 have been presented, it should be appreciated these experimental results do not in any way limit the scope of the embodiments described herein.

While the above description provides examples and specific details of various embodiments, it will be appreciated that some features and/or functions of the described embodiments admit to modification without departing from the scope of the described embodiments. The detailed description of embodiments presented herein is intended to be illustrative of the invention, the scope of which is limited only by the language of the claims appended hereto.

The invention claimed is:

1. An optical receiver comprising:
a photodetector for generating a detection signal representative of an optical data signal received at the photodetector, the detection signal having a distortion component caused by an operating characteristic of the photodetector;
an amplifier for amplifying the detection signal to generate an amplified detection signal; and
a signal compensation circuit for generating a reconstructed data signal from the amplified detection signal, the signal compensation circuit comprising a decision feedback equalizer matched to the operating characteristic of the photodetector to substantially suppress the distortion component of the detection signal in the reconstructed data signal.

2. The optical receiver of claim 1, wherein the operating characteristic of the photodetector comprises a diffusion current induced in the photodetector by the optical data signal.

3. The optical receiver of claim 1, wherein the decision feedback equalizer comprises:
a summer configured to generate a compensated detection signal by subtracting a feedback compensation signal from the amplified detection signal;
a non-linear element coupled to the summer to generate the reconstructed data signal from the compensated detection signal; and
at least one filter coupled between the non-linear element and the summer in a feedback compensation loop to generate the feedback compensation signal based on the reconstructed data signal, the at least one filter configured to model the operating characteristic of the photodetector so that the distortion component of the detection signal is substantially reproduced by the feedback compensation signal.

4. The optical receiver of claim 3, wherein the non-linear element comprises a signal quantizer.

5. The optical receiver of claim 3, wherein the non-linear element comprises a high-pass filter and a hysteretic comparator coupled to the high-pass filter.

6. The optical receiver of claim 3, wherein the decision feedback equalizer comprises a plurality of filters coupled between the non-linear element and the summer in parallel in the feedback compensation loop, each of the plurality of filters configured to provide a respective portion of the feedback compensation signal.

7. The optical receiver of claim 6, wherein each of the plurality of filters is a single-pole continuous-time filter.

8. The optical receiver of claim 6, wherein the plurality of filters comprises at least one digital filter and at least one continuous-time filter, the at least one digital filter configured to compensate fast distortion components and the at least one continuous-time filter configured to compensate slow distortion components.

9. The optical receiver of claim 8, wherein each of the at least one continuous-time filter is a single-pole filter and the at least one digital filter comprises a higher-order finite impulse response filter.

10. The optical receiver of claim 6, wherein the decision feedback equalizer comprises between three and five filters arranged in parallel in the feedback compensation loop.

11. The optical receiver of claim 3, wherein the signal compensation circuit further comprises a control module for configuring the decision feedback equalizer to match the operating characteristic of the photodetector by adjusting at least one parameter of the decision feedback equalizer.

12. The optical receiver of claim 11, wherein the at least one parameter of the decision feedback equalizer comprises a time constant or a gain value for the at least one filter.

13. The optical receiver of claim 11, wherein the control module comprises:
a dc extractor for measuring a dc component of the compensated detection signal;
a dc reference generator for generating a reference dc component of the compensated detection signal;
a second summer configured to generate a compensation error signal by comparing the measured and reference dc components of the compensated detection signal, the compensation error signal being representative of uncompensated distortion in the compensated detection signal; and
a filter controller configured to generate control values based on the compensation error signal used to adjust the at least one parameter of the decision feedback equalizer.

14. The optical receiver of claim 13, wherein the dc reference generator comprises a peak detector for generating an envelope signal representative of a pulse height of the optical data signal, and a scaler coupled to the peak detector for scaling the envelope signal according to a bit distribution of the optical data signal to generate the reference dc component of the compensated detection signal.

15. The optical receiver of claim 13, wherein the decision feedback equalizer comprises at least one continuous-time filter implemented by a controllable RC-network, and the filter controller is configured to apply control signals to the controllable RC-network based on the compensation error signal used to vary effective resistance and capacitance values of the controllable RC-network.

16. The optical receiver of claim 1, wherein the amplifier comprises a negative Miller capacitor incorporated into a core of the amplifier to extend an internal pole of the amplifier for increased bandwidth and phase margin.

17. The optical receiver of claim 1, further comprising an equalizer coupled between the amplifier and the signal compensation circuit for providing high-frequency signal boosting.

18. The optical receiver of claim 1, further comprising an ac coupling circuit coupled between the photodetector and the amplifier for suppressing low frequency components of the detection signal.

19. The optical receiver of claim 1, wherein the photodetector is a spatially modulated light detector, and the optical receiver further comprises a subtractor downstream of the photodetector configured to generate the detection signal by subtracting a pair of differential detection signals generated by the spatially modulated light detector.

20. The optical receiver of claim 1, wherein the photodetector is integrated monolithically within the optical receiver on a common semiconductor substrate.

21. The optical receiver of claim 19, wherein the optical receiver is implemented in CMOS or SiGe BiCMOS.

22. The optical receiver of claim 1, wherein the optical receiver has a bandwidth of at least 5 Gbps.

23. An optical receiver comprising:
a photodetector for generating a detection signal representative of an optical data signal received at the photodetector, the detection signal having a distortion component caused by an operating characteristic of the photodetector and a data component;
an amplifier for amplifying the detection signal to generate an amplified detection signal; and
a signal compensation circuit for generating a reconstructed data signal from the amplified detection signal to represent the data component of the detection signal, the signal compensation circuit comprising:
  a high-pass filter for generating an intermediate signal based on the amplified detection signal, the high-pass filter having a pass band configured to substantially suppress the distortion component of the detection signal; and
  a hysteretic comparator coupled to the high-pass filter configured to generate the reconstructed data signal based on the intermediate signal by restoring low-frequency content of the data component that is partially suppressed by the high-pass filter.

24. An optical receiver comprising:
a photodetector for generating a detection signal representative of an optical data signal received at the photodetector, the detection signal having a distortion component caused by an operating characteristic of the photodetector and a data component;
an amplifier for amplifying the detection signal to generate an amplified detection signal;
an ac coupling circuit coupled to the amplifier and configured to substantially suppress the distortion component of the detection signal; and
a signal compensation circuit for generating a reconstructed data signal to represent the data component of the detection signal, the signal compensation circuit comprising a hysteretic comparator configured to generate the reconstructed data signal based on the amplified detection signal by restoring low-frequency content of the data component that is partially suppressed by the ac coupling circuit.

* * * * *